(12) United States Patent
Baker et al.

(10) Patent No.: US 8,484,161 B2
(45) Date of Patent: Jul. 9, 2013

(54) LIVE FILE SYSTEM MIGRATION

(75) Inventors: William Eugene Baker, Austin, TX (US); Richard S. Brown, Frankfort, IL (US); Piyush Shivam, Austin, TX (US)

(73) Assignee: Oracle International Corporation, Redwood Shores, CA (US)

( * ) Notice: Subject to any disclaimer, the term of this patent is extended or adjusted under 35 U.S.C. 154(b) by 141 days.

(21) Appl. No.: 13/220,498

(22) Filed: Aug. 29, 2011

(65) Prior Publication Data

US 2013/0054530 A1 Feb. 28, 2013

(51) Int. Cl.
*G06F 17/30* (2006.01)

(52) U.S. Cl.
USPC .......................... 707/639; 707/646; 707/810

(58) Field of Classification Search
USPC ................... 707/639, 810, 999.204, 646
See application file for complete search history.

(56) References Cited

U.S. PATENT DOCUMENTS

| | | | | |
|---|---|---|---|---|
| 7,363,633 | B1* | 4/2008 | Goldick et al. | 719/328 |
| 7,734,954 | B2* | 6/2010 | Davis et al. | 714/15 |
| 7,797,355 | B1* | 9/2010 | Lanzatella et al. | 707/810 |
| 8,135,930 | B1* | 3/2012 | Mattox et al. | 711/162 |
| 8,146,082 | B2* | 3/2012 | Belay | 718/1 |
| 8,341,370 | B2* | 12/2012 | Wankhade | 711/164 |
| 2001/0056438 | A1* | 12/2001 | Ito | 707/204 |
| 2009/0276771 | A1* | 11/2009 | Nickolov et al. | 717/177 |
| 2010/0082922 | A1* | 4/2010 | George et al. | 711/162 |
| 2010/0094948 | A1* | 4/2010 | Ganesh et al. | 709/212 |
| 2010/0250718 | A1* | 9/2010 | Igarashi et al. | 709/221 |
| 2010/0333116 | A1* | 12/2010 | Prahlad et al. | 719/328 |
| 2011/0066597 | A1* | 3/2011 | Mashtizadeh et al. | 707/640 |
| 2012/0042034 | A1* | 2/2012 | Goggin et al. | 709/216 |
| 2012/0310888 | A1* | 12/2012 | Kuznetzov et al. | 707/639 |

OTHER PUBLICATIONS

IETF.org, "Network File System (NFS) Version 4 Protocol," http://www.ietf.org/rfc/rfc3530.txt, Apr. 2003, 245 pages.

* cited by examiner

*Primary Examiner* — Robert Beausoliel, Jr.
*Assistant Examiner* — Noosha Arjomandi
(74) *Attorney, Agent, or Firm* — Osha Liang LLP

(57) ABSTRACT

In general, the invention relates to a method for migrating a source file system residing on a source server to a destination server. The method includes sending a first snapshot of the source file system from the source server to the destination server and creating, using the first snapshot, a migrated file system on the destination server. The method further includes sequentially sending, to the destination server, a set of snapshot deltas including modifications to the source file system, updating the migrated file system using the set of snapshot deltas, determining that a freeze threshold is exceeded, freezing the source file system, sending a final snapshot delta from the source server to the destination server, updating the migrated file system using the final snapshot delta, creating a file system husk referencing the migrated file system, and thawing the source file system and the migrated file system.

19 Claims, 15 Drawing Sheets

LIVE FILE SYSTEM MIGRATION

BACKGROUND

A file system provides a mechanism for the storage and retrieval of files. File systems store application data as well as information describing the characteristics of application data (i.e., metadata). A file system may also include a programming interface to enable the creation and deletion of files, reading and writing of files, performing seeks within a file, creating and deleting directories, managing directory contents, and etc. An operating system is configured to utilize the programming interface in order to manage the file system and to facilitate the interaction of executing applications with data residing in the file system.

A file system may be migrated from a source server to a destination server. Traditional migration of a file system requires significant down time and may result in a loss of data, protocol information (e.g., state and client protocol information), and/or resource availability.

SUMMARY

In general, in one aspect, the invention relates to a method for migrating a source file system residing on a source server to a destination server. The method includes: sending a first snapshot of the source file system from the source server to the destination server; creating, using the first snapshot, a migrated file system on the destination server; sequentially sending, from the source server to the destination server, a set of snapshot deltas including modifications to the source file system; updating the migrated file system using the set of snapshot deltas; determining that a freeze threshold is exceeded based on a snapshot delta of the set of snapshot deltas; and, in response to determining that the freeze threshold is exceeded: freezing the source file system, where the source file system is active prior to freezing, sending, after freezing the source file system, a final snapshot delta from the source server to the destination server, updating the migrated file system using the final snapshot delta, creating, in the source file system, a file system husk referencing the migrated file system, and thawing the source file system and the migrated file system after updating the migrated file system.

In general, in one aspect, the invention relates to a non-transitory computer-readable medium storing instructions for migrating a source file system residing on a source server to a destination server. The instructions include functionality to: send a first snapshot of the source file system from the source server to the destination server; create, using the first snapshot, a migrated file system on the destination server; sequentially send, from the source server to the destination server, a set of snapshot deltas including modifications to the source file system; update the migrated file system using the set of snapshot deltas; determine that a freeze threshold is exceeded based on a snapshot delta of the set of snapshot deltas; and, in response to determining that the freeze threshold is exceeded: freeze the source file system, where the source file system is active prior to freezing, send, after freezing the source file system, a final snapshot delta from the source server to the destination server, update the migrated file system using the final snapshot delta, create, in the source file system, a file system husk referencing the migrated file system, and thaw the source file system and the migrated file system after updating the migrated file system.

In general, in one aspect, the invention relates to a system for migrating file systems. The system includes: a source server including a source file system; a destination server; and a migration manager configured to: send a first snapshot of the source file system from the source server to the destination server, create, using the first snapshot, a migrated file system on the destination server, sequentially send, from the source server to the destination server, a set of snapshot deltas including modifications to the source file system, update the migrated file system using the set of snapshot deltas, determine that a freeze threshold is exceeded based on a snapshot delta of the set of snapshot deltas, and, in response to determining that the freeze threshold is exceeded: freeze the source file system, where the source file system is active prior to freezing, send, after freezing the source file system, a final snapshot delta from the source server to the destination server, update the migrated file system using the final snapshot delta; create, in the source file system, a file system husk referencing the migrated file system, and thaw the source file system and the migrated file system after updating the migrated file system.

Other aspects of the invention will be apparent from the following description and the appended claims.

DETAILED DESCRIPTION

Figure 1:
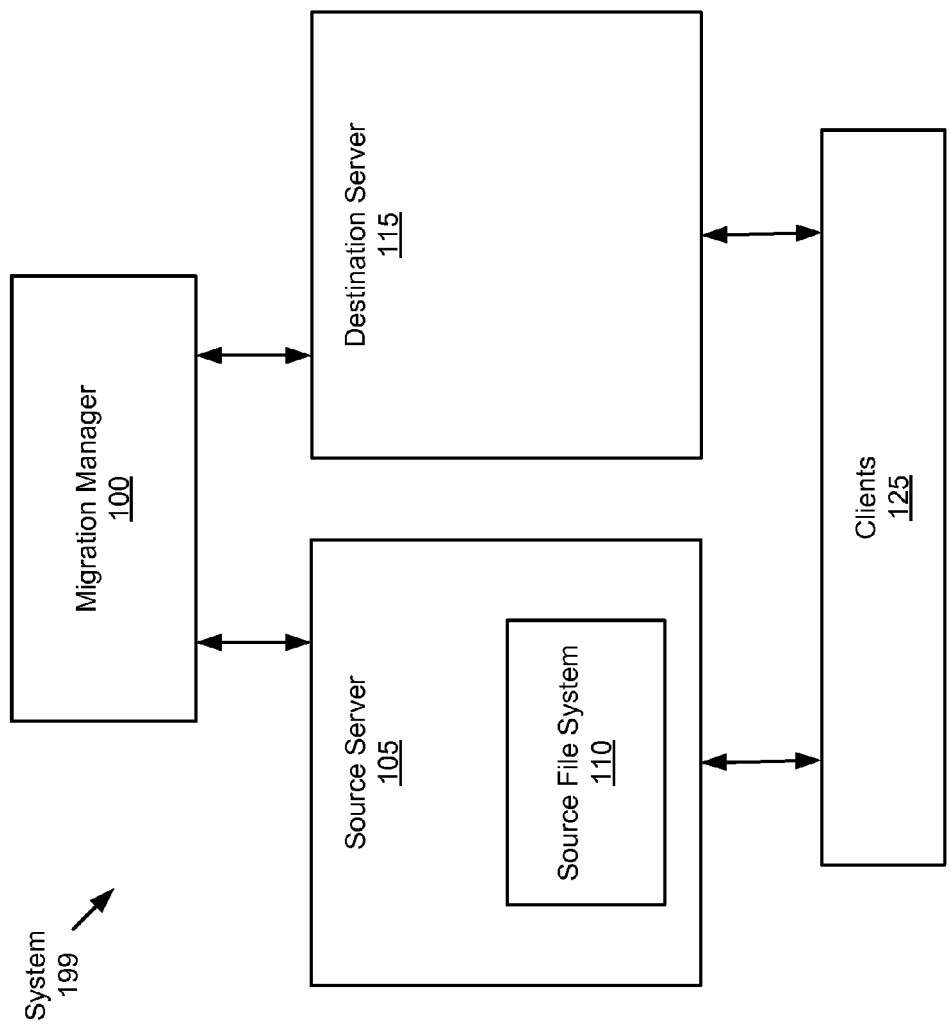
FIGS. 1-2 show schematic diagrams in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to a system and method for migrating a file system from a source server to a destination server. The migrated file system is created on the destination server by sending iterative snapshots of the file system from the source server. Further, embodiments of the invention harvest a protocol state of the file system on the source server and replicate the protocol state in the migrated file system on the destination server.

FIG. 1 shows a system (199) in accordance with one embodiment of the invention. As shown in FIG. 1, the system has multiple components including a migration manager (100), a source server (105), a source file system (110), a destination server (115), and clients (125). In one or more embodiments of the invention, the components of the system (199) may be located on separate devices, operatively connected with one another. One or more of the components may also reside within other components. For example, the migration manager (100) may reside within the source server (105) or the destination server (115), in various embodiments of the invention. Those skilled in the art will appreciate that there may be more than one of each separate component running on the system (199), as well as any combination of these components within a given embodiment of the invention.

In one or more embodiments of the invention, the source server (105) and the destination server (115) are hardware computing devices or collections of hardware computing devices. Alternatively, in one or more embodiments of the invention, the source server (105) and/or the destination server (115) are virtual machines executing on a computing device.

In one or more embodiments of the invention, the source file system (110) includes functionality to store, retrieve and/or modify data on one or more physical storage devices (e.g., a hard disk drive, a RAID configuration, an optical drive, a tape drive, etc.). An operating system of the source server (105) may be configured to mediate calls from one or more applications to the file system.

In one or more embodiments of the invention, the clients (125) are a set of computing devices configured to access the source server (105) and/or the destination server (115). The clients (125) may include one or more applications configured to communicate with the source file system (110). For example, the client(s) (125) may be configured to access the source file system (110) over a local area network (LAN) by mapping a network drive.

In one or more embodiments of the invention, the migration manager (100) is a software application or a component of a software application executing on a computing device. The migration manager (100) may reside in the source server (105), the destination server (115), or any other computing device in accordance with various embodiments of the invention.

In one or more embodiments of the invention, the migration manager (100) includes functionality to initiate migration of the source file system (110) from the source server (105) to the destination server (115). The migration manager (100) may be configured to receive input from a user, a software application, or any other entity in order to initiate the migration. In one or more embodiments of the invention, the migration manager (100) includes a user interface (not shown) configured to obtain input from a user. The migration manager (100) may receive instructions from the user, through the user interface, to initiate the migration. The instructions may include identifying information (e.g., internet protocol (IP) address, network name, etc.) of the source and/or destination servers, identifying information of the source file system (110) (e.g., file system identification (FSID), etc.), and/or any other information necessary to initiate/complete the migration.

Figure 2:
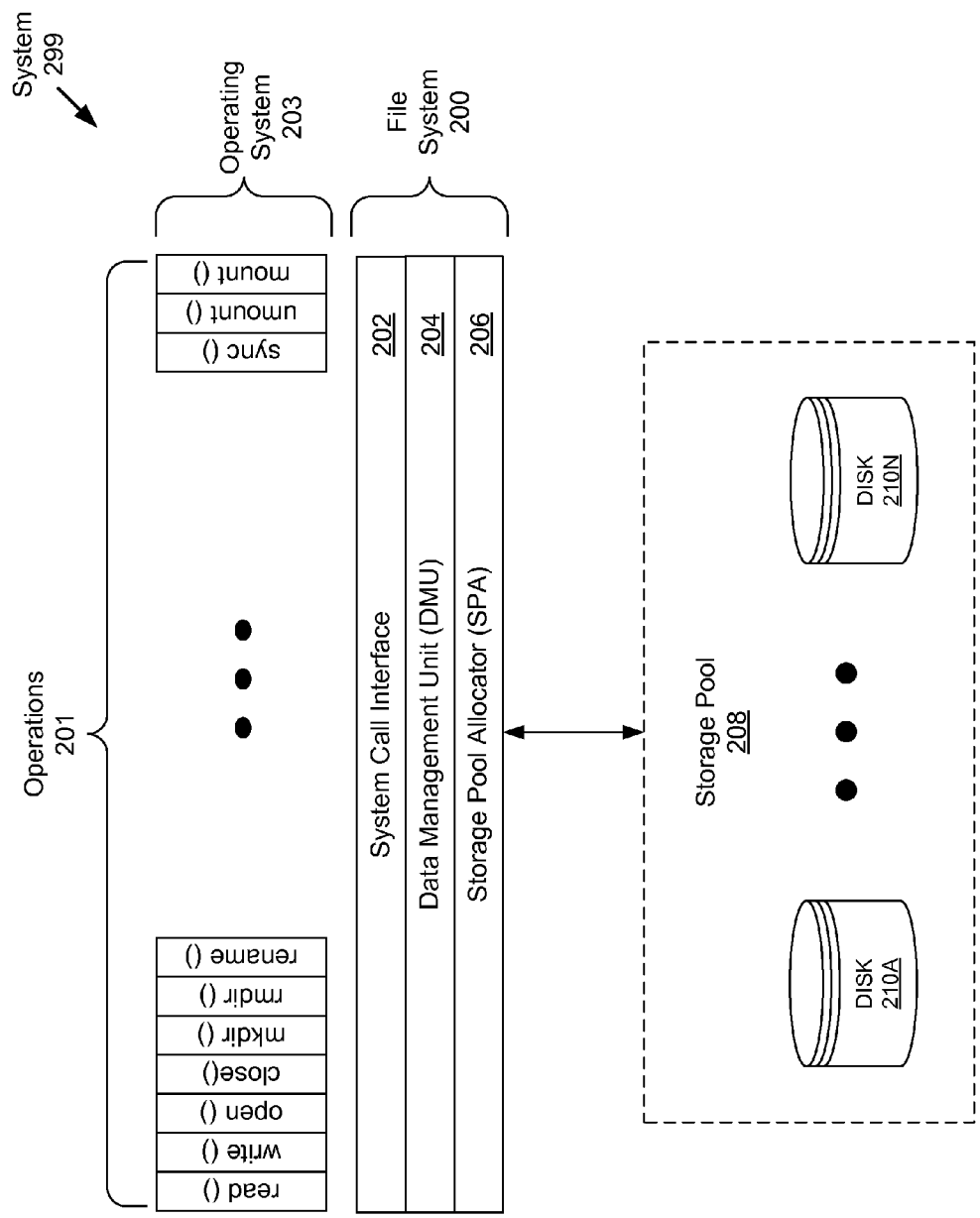

FIG. 2 shows a system (299) architecture in accordance with one embodiment of the invention. The system architecture includes an operating system (203) interacting with a file system (200), which in turn interfaces with a storage pool (208). In one or more embodiments of the invention, the file system (200) includes a system call interface (202), a data management unit (DMU) (204), and a storage pool allocator (SPA) (206). Those skilled in the art will appreciate that there may be more than one of each separate component running on a device, as well as any combination of these components within a given embodiment of the invention.

Those skilled in the art will appreciate that the invention is not limited to the file systems and file system components depicted in FIGS. 1-8 (e.g., source file system (110) of FIG. 1, file system (200) of FIG. 2). More specifically, embodiments of the invention may be implemented using any format or type of file system without departing from the invention. Examples of file systems may include, but are not limited to, ZFS, Network File System (NFS), File Allocation Table (FAT), New Technology File System (NTFS), and various other types. Furthermore, one or more of the file systems may be a disk, distributed, network, transactional, database, and/or special purpose file system, in accordance with various embodiments of the invention.

Turning to FIG. 2, in one or more embodiments of the invention, the file system (200) may be migrated from a source server to a destination server. FIGS. 6A-6D describe one or more methods of performing such a migration, in accordance with various embodiments of the invention. The system (299) of FIG. 2 may represent an exemplary source server (e.g., source server (105) of FIG. 1, discussed above) and/or destination server (e.g., destination server (115) of FIG. 1, discussed above) involved in the migration of a file system, in accordance with various embodiments of the invention.

The operating system (203) typically interfaces with the file system (200) via a system call interface (202). The operating system (203) provides operations (201) for users to access files within the file system (200). These operations (201) may include read, write, open, close, etc. In one or more embodiments of the invention, the file system (200) is an object-based file system (i.e., both data and metadata are stored as objects). More specifically, the file system (200) includes functionality to store both data and corresponding metadata in the storage pool (208). Thus, the aforementioned operations (201) provided by the operating system (203) correspond to operations on objects.

More specifically, in one or more embodiments of the invention, a request to perform a particular operation (201) (i.e., a transaction) is forwarded from the operating system (203), via the system call interface (202), to the DMU (204). In one or more embodiments of the invention, the DMU (204) translates the request to perform an operation on an object directly to a request to perform a read or write operation at a physical location within the storage pool (208). More specifically, the DMU (204) represents the objects as data blocks and indirect blocks as described in FIG. 3 below. Additionally, in one or more embodiments of the invention, the DMU (204) includes functionality to group related work (i.e., modifications to data blocks and indirect blocks) into I/O requests (referred to as a "transaction group") allowing related blocks to be forwarded to the SPA (206) together. The SPA (206) receives the transaction group from the DMU (204) and subsequently writes the blocks into the storage pool (208).

In one or more embodiments of the invention, the storage pool (208) includes one or more physical disks (210A-210N). Further, in one or more embodiments of the invention, the storage capacity of the storage pool (208) may increase and decrease dynamically as physical disks are added and removed from the storage pool. In one or more embodiments of the invention, the storage space available in the storage pool (208) is managed by the SPA (206).

As discussed above, the SPA (206) provides an interface to the storage pool and manages allocation of storage space within the storage pool (208). More specifically, in one or more embodiments of the invention, the SPA (206) uses a metaslab allocator (not shown) to manage the allocation of storage space in the storage pool (208).

In one or more embodiments of the invention, the storage space in the storage pool (208) is divided into contiguous regions of data, i.e., metaslabs. The metaslabs may in turn be divided into segments (i.e., portions of the metaslab). Each of the segments within the metaslab may be used to store a data block (i.e., data) or an indirect block (i.e., metadata). The segments may all be the same size, or alternatively, may be a range of sizes. A metaslab allocator (not shown) includes functionality to allocate large or small segments to store data blocks and indirect blocks. In one or more embodiments of the invention, allocation of the segments within the metaslabs is based on the size of the blocks within the I/O requests. That is, small segments are allocated for small blocks, while large segments are allocated for large blocks. The allocation of segments based on the size of the blocks may allow for more efficient storage of data and metadata in the storage pool by reducing the amount of unused space within a given metaslab. Further, using large segments for large blocks may allow for more efficient access to data (and metadata) by reducing the number of DMU (204) translations and/or reducing the number of I/O operations. In one or more embodiments of the invention, the metaslab allocator may include a policy that specifies a method to allocate segments.

Figure 3:
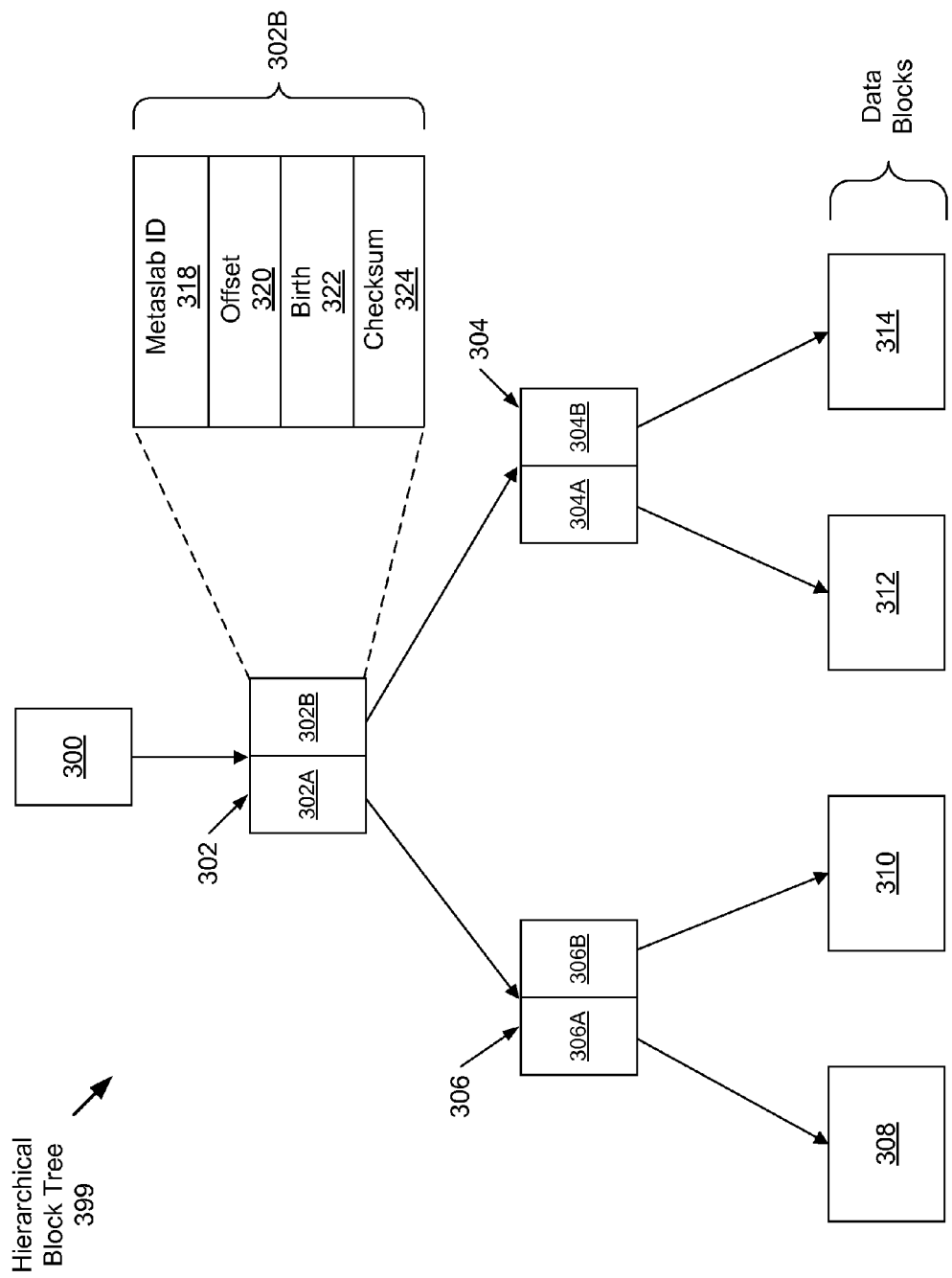
FIGS. 3-4 show example hierarchical block trees in accordance with one or more embodiments of the invention.

FIG. 3 shows the hierarchical block tree (399) (hereinafter referred to as a "HBT") for storing data blocks and indirect blocks within the storage pool in accordance with one embodiment of the invention. In one or more embodiments of the invention, the HBT includes a root block (300), one or more levels of indirect blocks (302, 304, 306), and one or more data blocks (308, 310, 312, 314). In one or more embodiments of the invention, the location of the root block (300) is in a particular location within the storage pool. The root block (300) typically points to subsequent indirect blocks (302, 304, and 306). In one or more embodiments of the invention, indirect blocks (302, 304, and 306) may be arrays of block pointers (e.g., 302A, 302B, etc.) that, directly or indirectly, reference to data blocks (308, 310, 312, and 314). The data blocks (308, 310, 312, and 314) contain actual data of files stored in the storage pool. One skilled in the art will appreciate that several layers of indirect blocks may exist between the root block (300) and the data blocks (308, 310, 312, 314).

In contrast to the root block (300), indirect blocks and data blocks may be located anywhere in the storage pool (208 in FIG. 2). In one or more embodiments of the invention, the root block (300) and each block pointer (e.g., 302A, 302B, etc.) include data as shown in the expanded block pointer (302B). One skilled in the art will appreciate that data blocks do not include this information; rather data blocks contain actual data of files within the file system.

In one or more embodiments of the invention, each block pointer (e.g., 302A, 302B, etc.) includes a metaslab ID (318), an offset (320) within the metaslab, a birth value (322) of the block referenced by the block pointer, and a checksum (324) of the data stored in the block (data block or indirect block) referenced by the block pointer. In one or more embodiments of the invention, the metaslab ID (318) and offset (320) are used to determine the location of the block (data block or indirect block) in the storage pool. The metaslab ID (318) identifies a particular metaslab. More specifically, the metaslab ID (318) may identify the particular disk (within the storage pool) upon which the metaslab resides and where in the disk the metaslab begins. The offset (320) may then be used to reference a particular segment in the metaslab. In one or more embodiments of the invention, the data within the segment referenced by the particular metaslab ID (318) and offset (320) may correspond to either a data block or an indirect block. If the data corresponds to an indirect block, then the metaslab ID (318) and offset (320) within a block pointer in the indirect block are extracted and used to locate a subsequent data block or indirect block. The HBT may be traversed in this manner to eventually retrieve a requested data block.

In one or more embodiments of the invention, copy-on-write transactions are performed for every data write request to a file. Specifically, all write requests cause new segments to be allocated for the modified data. Therefore, the retrieved data blocks and indirect blocks are never overwritten (until a modified version of the data block and indirect block is committed). More specifically, the DMU writes out all of the modified data blocks in the HBT to unused segments within the storage pool. Subsequently, the DMU writes out the corresponding block pointers (within indirect blocks) to unused segments in the storage pool. In one or more embodiments of the invention, fields (i.e., metaslab ID, offset, birth, checksum) for the corresponding block pointers are populated by the DMU prior to sending an I/O request to the SPA. The indirect blocks containing the block pointers are typically written one level at a time. To complete the copy-on-write transaction, the SPA issues a single write that atomically changes (i.e., overwrites) the root block to reference the indirect blocks referencing the modified data block.

Using the infrastructure shown in FIGS. 1-3, the following discussion describes the creation of a snapshot of the HBT.

In one or more embodiments of the invention, the HBT corresponds to a group of blocks referenced, directly or indirectly, by a root block. As discussed above, as the blocks referenced by the root block are modified, the modified blocks are written to unused locations in the storage pool and the root block is modified to include references to the modified blocks.

A snapshot corresponds to a state of the HBT at a given time, where the state of the HBT corresponds to all blocks referenced, directly or indirectly, by the root block of the HBT at the aforementioned time. In one or more embodiments of the invention, the file system is configured to manage HBTs and snapshots concurrently.

Figure 4:
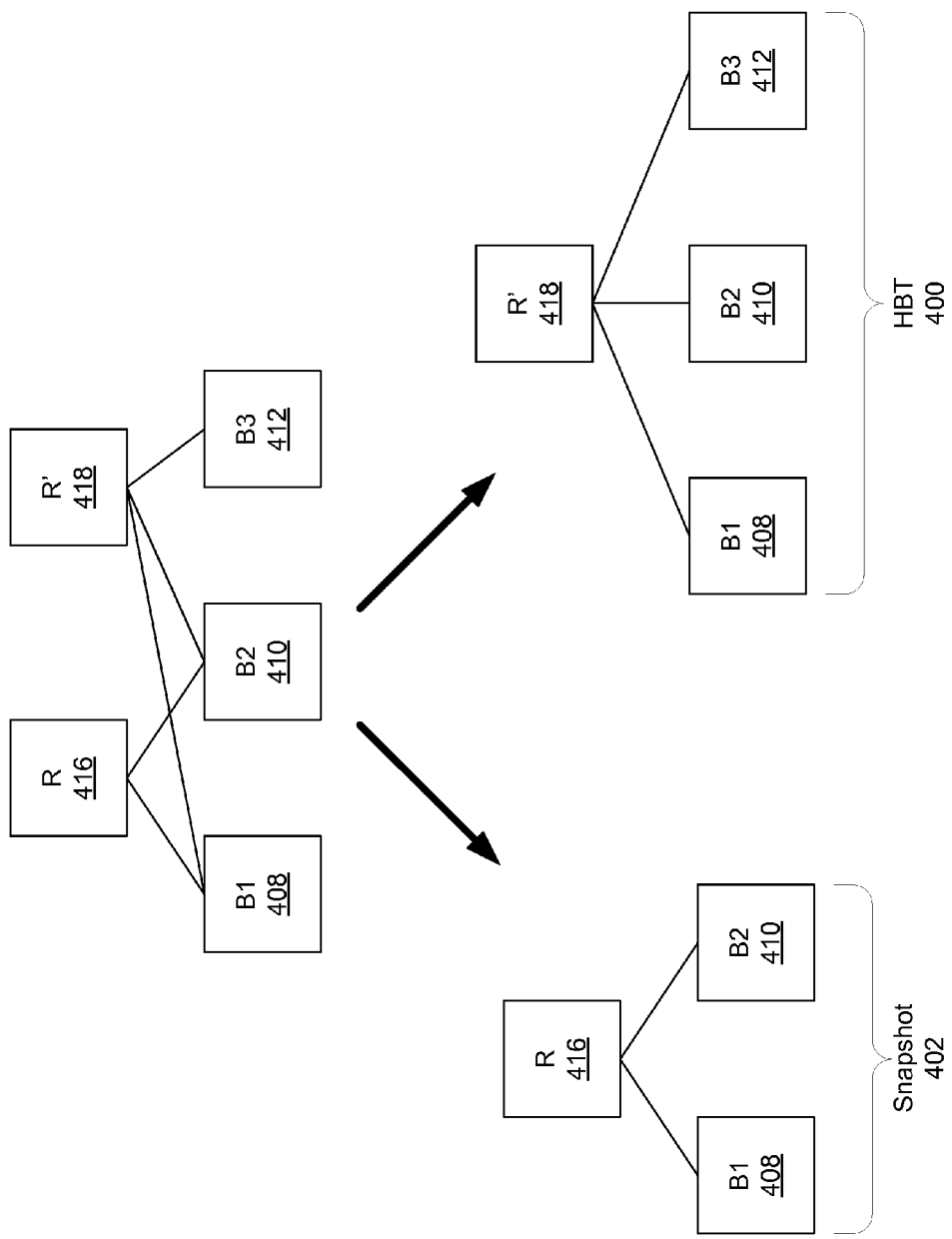

FIG. 4 shows an example hierarchical block tree and a snapshot in accordance with an embodiment of the invention. As shown in FIG. 4, each block (e.g., B1 (408), B2 (410), B3 (412)) may be referenced by, and therefore be a part of, the HBT (400), the snapshot (402).

Specifically, the HBT (400) includes a second version of the root block R' (418). The second version of the root block R' (418) in turn references blocks B1 (408), B2 (410), and B3 (412). Further, the snapshot (402) includes a first version of the root block R (416). The first version of the root block R (416) in turn references blocks B1 (408) and B2 (410).

As discussed above, the snapshot of the HBT correspond to the state of the HBT at a given time. Accordingly, in FIG. 4, the snapshot (402) corresponds to the state of the HBT (400) prior to the addition of block B3 (412) to the HBT (400).

In one or more embodiments of the invention, the HBT (400) and the snapshot (402) are each associated with their own dead list (not shown). In one or more embodiments of the invention, the dead list associated with the HBT (400) is initially empty. As the HBT is modified, the dead list associated with the HBT is updated to list all block pointers (along with the referenced birth time of the block) corresponding to blocks which are referenced in the snapshot (402), but are no longer referenced in the HBT (400). Further, the dead list associated with the snapshot (402) corresponds to the dead list associated with the HBT (400) at the time the snapshot was created.

Returning to FIG. 1, in one or more embodiments of the invention, the migration manager (100) includes functionality to generate one or more snapshots of the source file system (110). In one or more embodiments of the invention, the migration manager (100) includes functionality to send an initial snapshot of the source file system (110) from the source server (105) to the destination server (115). The initial snapshot may include all data blocks in the source file system. The migration manager (100) may be configured to send the snapshot using one or more transmission protocols (e.g., transmission control protocol) over a network connection. In one or more embodiments of the invention, the migration manager (100) is configured to encrypt the initial snapshot and/or any other data sent to the destination server (115).

In one or more embodiments of the invention, the migration manager (100) includes functionality to create a migrated file system in the destination server (115) using the initial snapshot.

In one or more embodiments of the invention, the migration manager (100) includes functionality to generate a snapshot delta by performing a comparison of two snapshots. A snapshot delta records a set of differences between two snapshots of the file system. In one or more embodiments of the invention, the migration manager (100) is configured to generate snapshot deltas of a source file system in order to transmit modifications to the source file system to the destination server (115) FIG. 6C depicts a method of generating a snapshot delta in accordance with one or more embodiments of the invention.

In one or more embodiments of the invention, the migration manager (100) includes functionality to sequentially send a set of snapshot deltas from the source server (105) to the destination server (115). In one or more embodiments of the invention, the migration manager (100) includes functionality to utilize iterative convergence for sending the snapshot deltas. A snapshot or snapshot delta may include file system data (e.g., data blocks), metadata associated with the file system (e.g., indirect blocks), and/or any data used in reconstructing the file system on the destination server (115) in accordance with various embodiments of the invention.

In one or more embodiments of the invention, the migration manager (100) includes functionality to create and/or obtain one or more freeze thresholds. A freeze threshold may be any criteria for freezing a file system. When freezing a file system, a server may allow any in-flight operations (i.e., snapshot deltas which are en route to the destination server (115)) to complete without allowing any new operations to begin. Upon completing in-flight operations, the server may send a complete, consistent file system snapshot to the destination server (115). While the file system is frozen, the server may hold or deny modifying operations from the clients, using one or more network protocols. Examples of a freeze threshold may include, but are not limited to, a transmission time duration for sending a snapshot delta, a size of a snapshot delta, a percentage change between successive snapshot deltas, and/or any other criteria, or any combination thereof.

In one or more embodiments of the invention, the migration manager (100) may repeatedly generate snapshots and send snapshot deltas of the file system to the destination server (115) until a freeze threshold is exceeded. In one or more embodiments of the invention, the sequence of snapshot deltas decrease in size as the time for generating and sending the snapshot deltas decreases. Thus, the first snapshot delta may be the largest of the sequence, while the last snapshot delta may be the smallest. In one or more embodiments of the invention, variations in usage of the source file system, a network disruption, a transmission error, and/or other factor may cause one or more snapshot deltas to be larger than one or more preceding snapshot deltas.

In one or more embodiments of the invention, the migration manager (100) includes functionality to determine that a freeze threshold is exceeded. The migration manager (100) may perform one or more periodic comparisons in order to determine whether a criterion defined by the freeze threshold is met. If the migration manager (100) determines that the criterion is met, it is determined that the freeze threshold is exceeded.

In one or more embodiments of the invention, the migration manager (100) includes functionality to freeze the source file system in response to determining that a freeze threshold is exceeded. A file system may be referred to as "active" when it is capable of performing one or more write operations and/or being modified. In one or more embodiments of the invention, a frozen file system may not be modified and/or read. Activating a file system may include enabling read and/or write functionality in the file system.

In one example, a freeze threshold defines a size threshold for snapshot deltas. In this example, the migration manager compares each generated snapshot delta against the size threshold. If the size of the snapshot delta is less than the size threshold, the migration manager determines that the freeze threshold is exceeded. In another example, the freeze threshold defines a percentage change in the snapshot delta size. In this example, the migration manager compares each successive snapshot delta against a previous snapshot delta in order to calculate a percentage change. Then, the migration manager compares the percentage change against the percentage change defined by the freeze threshold. If the percentage change of the snapshot deltas falls below the predefined percentage, the migration manager determines that the freeze threshold is exceeded. In a third example, the freeze threshold defines a threshold number of clients actively communicating with the file system. In this example, the migration manager periodically (in conjunction with generating the snapshot delta(s)) detects how many clients are actively using the source file system (e.g., have an open/locked file, have made modifications in a predefined time window, etc.). The migration manager compares the number of clients with the threshold number of clients. If the threshold number of clients exceeds the actual number of clients, the migration manager determines that the freeze threshold is exceeded.

In one or more embodiments of the invention, the migration manager (100) includes functionality to send, after freezing the source file system (110), a final snapshot delta from the source server to the destination server (115). The migration manager (100) then updates the migrated file system using the final snapshot delta such that the frozen source file system (110) and the migrated file system are identical (with regard to application data blocks). In one or more embodiments of the invention, the encoded protocol state structure is transmitted to the destination server (115) with the final snapshot delta.

For example, when using Network File System version 4 (NFSv4), the DELAY error may be used to indicate that a requested operation cannot complete and must be resubmitted later. In another example, when using Network File System version 3 (NFSv3), the JUKEBOX error may used. Other protocols may use different mechanisms. The granularity of the freeze operation may correspond to the granularity of a migrated object, in order to minimize interruption of service to other data (e.g., other file systems the server may be offering).

In one or more embodiments of the invention, the migration manager (100) includes functionality to determine whether a maximum freeze duration is exceeded. If during generation and/or transmission of the final snapshot, the migration manager (100) determines that the maximum freeze duration is exceeded, the source server may thaw the source file system and defer sending the final snapshot until after the next snapshot delta or until the freeze threshold is met again. This process may continue indefinitely or may be deferred until a pre-defined future time period, in accordance with various embodiments of the invention.

In one or more embodiments of the invention, the migration manager (100) includes functionality to create, in the source file system (110), a file system husk (not shown) referencing the migrated file system. The file system husk may be an empty file system that has the necessary infrastructure to receive and redirect requests directed towards a source file system and to a migrated file system on the destination server (115).

In one or more embodiments of the invention, the file system husk includes functionality to obtain a request for a file handle originally in the source file system. A file handle is an abstract indicator used in accessing a file. In response to the request, the file system husk may detect that the file system has indeed moved and determine its new location in the destination server (115). In one or more embodiments of the invention, the file system husk is configured to reconstitute the file handle after a source server restart. Thus, the integrity of the file handle may be maintained despite any required or inadvertent reboot of the source server during or after the migration process.

In one or more embodiments of the invention, the migration manager (100) includes functionality to thaw the source file system (110) and the migrated file system. The thaw operation may include activating the source file system (110) and/or the migrated file system. In one or more embodiments of the invention, a thaw operation may be used to signal the completion of a migration event and/or to resume normal access in the case of a fatal error or any other similar, possibly transient, condition. In one example of an NFSv4 file system, as the clients (125) resume accessing the migrated file system (after the thaw), the source server (105) detects that the migration has occurred and returns NFS4ERR_MOVED, causing the client to fetch the "fs_locations" attribute to discover the file system's new location. The client then connects to the destination server (115) and resumes access to the data.

In one example, the amount of change to the source file system data and metadata shrinks due to smaller and smaller change windows (and, thus, snapshot deltas) and the transmission time of the snapshot delta(s) reduces to below an administratively defined freeze duration. In this example, once this criterion is exceeded, the migration manager (100) freezes the file system, makes a final snapshot (including protocol state information), and sends it to the destination server.

In one or more embodiments of the invention, the migration manager (100) includes functionality to preserve file handles across the migration. The migration manager (100) may preserve the file identifier (FID) within the snapshot(s) and snapshot delta(s) as part of the send/receive operation between the source server (105) and the destination server (115). The migration manager (100) may also preserve other parts of the file handle, e.g., the FSID, so that a client can use the same file handle regardless to which server the source file system (110) is migrated. For example, the FSID may be stored as a persistent attribute within the source file system (110). Being part of the source file system (110), the FSID may remain the same regardless to which server the source file system (110) moves.

In one or more embodiments of the invention, a set of cooperating servers may use a common service to generate unique FSIDs. This may guarantee that FSIDs will not conflict as file systems are moved or copied between cooperating servers.

Figure 5:
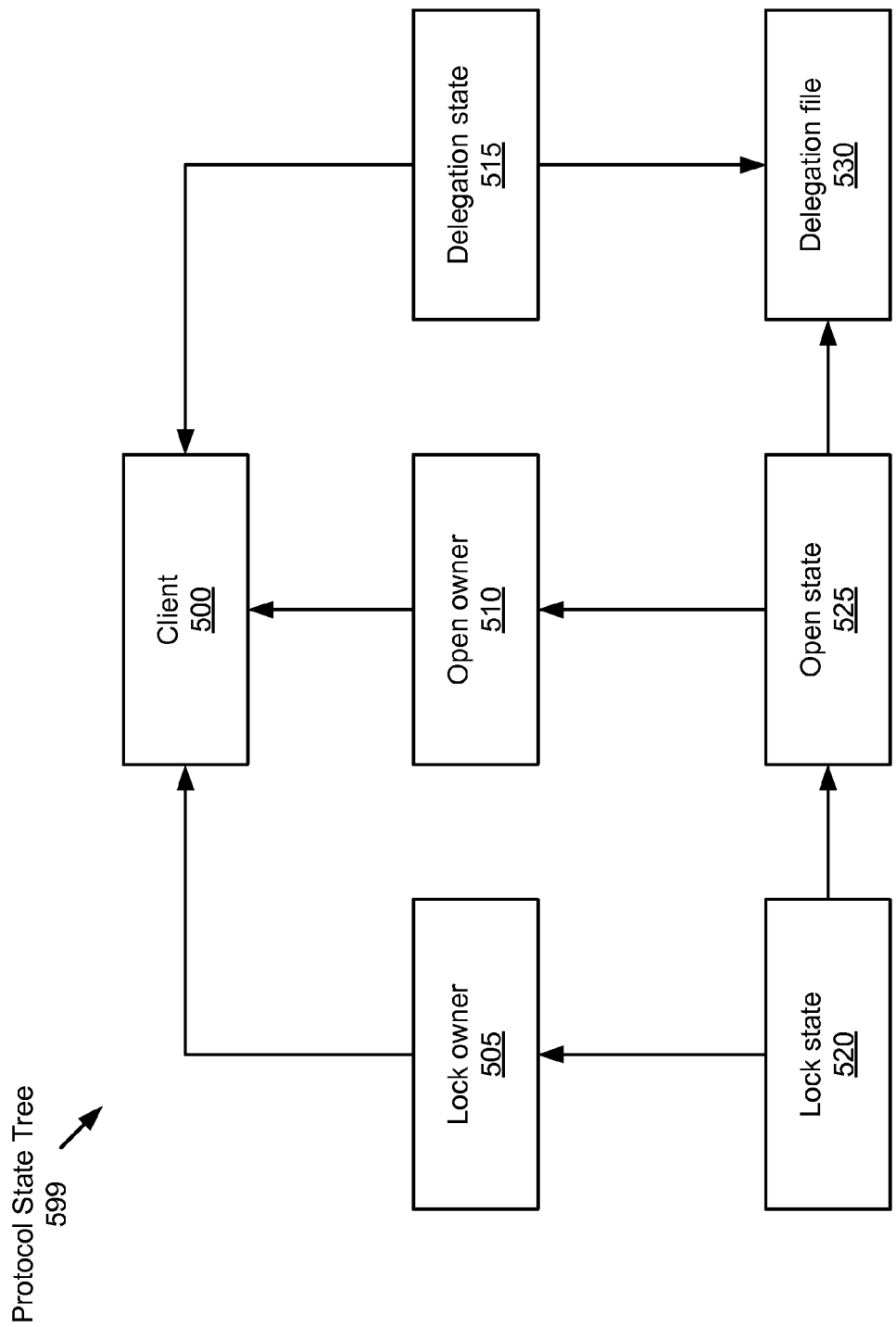
FIG. 5 shows an example protocol state tree in accordance with one embodiment of the invention.

FIG. 5 shows a portion of an exemplary protocol state tree (PST) (599) in accordance with one embodiment of the invention. As shown in FIG. 5, the PST has multiple nodes including client (500), lock owner (505), open owner (510), delegation state (515), lock state (520), open state (525), and delegation file (530). Those skilled in the art will appreciate that there may be more than one of each separate node in the PST (599), as well as any combination of these nodes within a given embodiment of the invention.

In the example depicted by FIG. 5, the protocol state tree (599) is a structure storing protocol data. Various different types of protocol state structures may exist in accordance with various embodiments of the invention. Examples of a protocol state structure may include, but is not limited to, a list, a B-tree, a hash map, an array, a table, a stack, a queue, and/or any other structure capable of storing protocol data. In one or more embodiments of the invention, protocol data includes data utilized in providing file system access to one or more client computing devices and/or applications. Protocol data may also include a variety of other metadata including information regarding the state of the file system.

In the example depicted by FIG. 5, the protocol state tree (599) includes a root node ("client" (500)) storing identifying information of a client computing device. The identifying information may include an internet protocol (IP) address or any other form of identification corresponding to the client.

In the example depicted by FIG. 5, the protocol state tree (599) includes a plurality of non-root nodes, either directly or indirectly connected to the root node. The node "delegation file" (530) includes a reference to a file in the file system, which is accessed by the client while "lock owner" (505) includes data relating to an owner of a lock obtained on the file. Those skilled in the art will appreciate that the invention is not limited to the protocol state tree shown in FIG. 5. Further, those skilled in the art will appreciate that the invention may be implemented using different protocols and different protocol state trees with departing from the invention.

Returning to FIG. 1, in one or more embodiments of the invention, the migration manager (100) includes functionality to extract protocol state data from a protocol state structure in the source server (105). For example, the migration manager (100) may extract client protocol state data by traversing a protocol state tree according to an embodiment for tree traversal. Examples of protocol state data may include information identifying one or more file locks, share locks, permissions, session states, and/or etc.

In one or more embodiments of the invention, the migration manager (100) includes functionality to encode protocol state data into an encoded protocol state structure. The migration manager (100) may encode the protocol state data using any method of encryption or encoding. For example, the migration manager (100) may generate a single compressed file containing the protocol state data and optionally encrypt the file using advanced encryption standard (AES) encryption.

In one or more embodiments of the invention, the migration manager (100) includes functionality to send an encoded protocol state structure from the source server (105) to the destination server (115). The migration manager (100) may harvest and transmit the encoded protocol state structure after freezing the source file system so that further modifications are not made to the protocol state structure while it is being migrated to the destination server (115), in one or more embodiments of the invention. The encoded protocol state structure may be sent with a final snapshot delta.

In one or more embodiments of the invention, the migration manager (100) includes functionality to decode the encoded protocol state structure. The migration manager may decode the protocol state data from the encoded structure and import it into a protocol state structure in the migrated file system.

In one or more embodiments of the invention, one or more functions of the migration manager (100) may be performed by the source server (105) and/or the destination server (115). For example, a file system or operating system of the source server (105) may be configured to generate the snapshot deltas and/or encode the protocol state data into an encoded protocol state structure. In one or more embodiments of the invention, the migration manager (100) does not exist, and all relevant migration functionality is delegated to the operating system and file system of the source server (105) and destination server (115).

In one or more embodiments of the invention, when migrating protocol state data, the migration manager (100) enables clients to use protocol state data established at the source server (105) to issue I/O operations to the destination server (115). Because the client may already have state established with the destination server (115) prior to the migration event, the construction of protocol state data may be unique at each server. For example, in the context of NFSv4 protocol, protocol state data may include the write verifier, clientIDs, and/or stateIDs. In one or more embodiments of the invention, the protocol state data may include a numeric identifier of the protocol state tree, called a nodeid. The nodeid may be generated by a common service that guarantees a unique nodeid for each server involved in file system migration, in accordance with various embodiments of the invention.

Figure 6A:
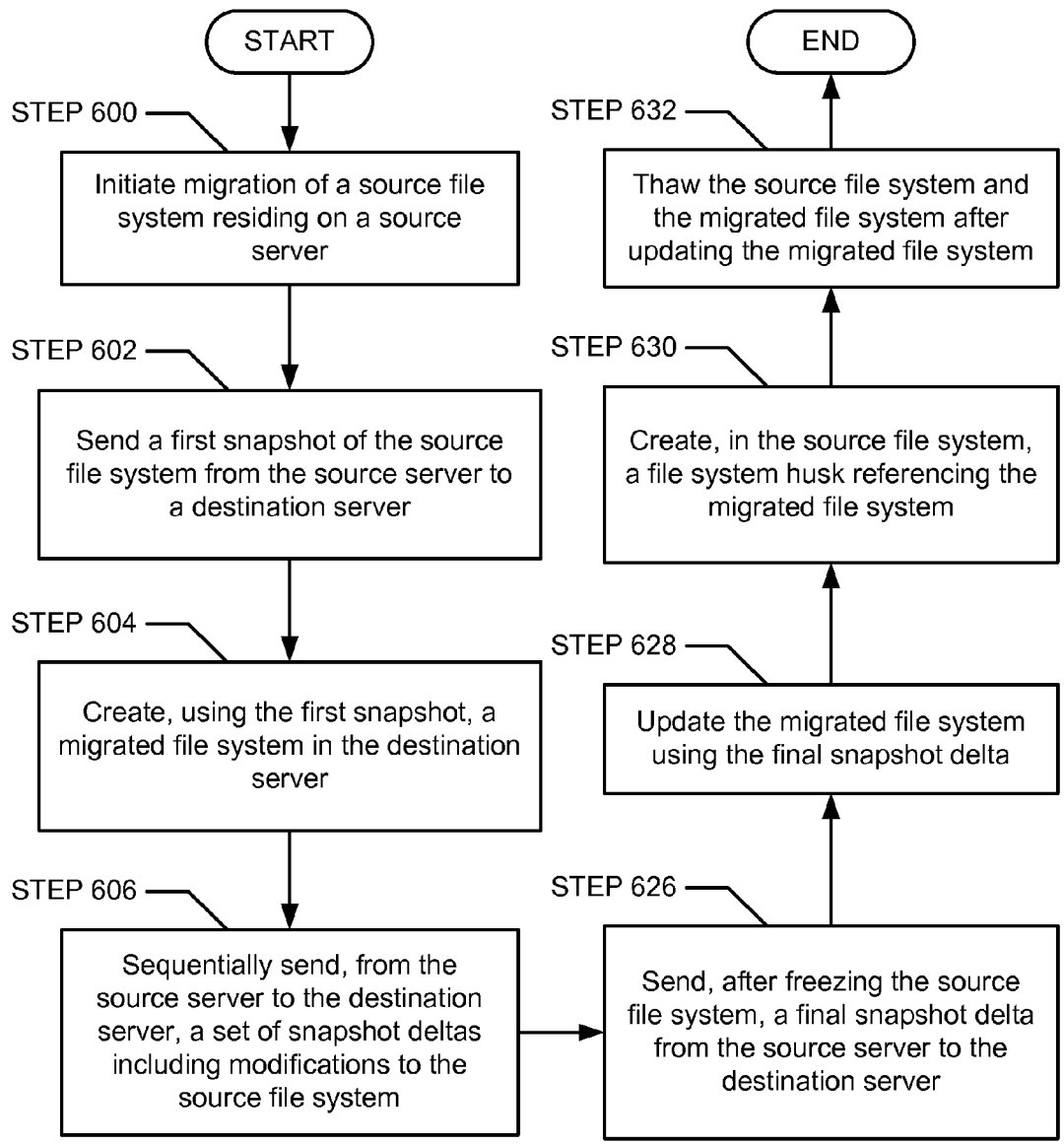
FIGS. 6A-6D show flowcharts in accordance with one or more embodiments of the invention.

FIG. 6A shows a flowchart of a method for migrating a file system from a source server to a destination server. While the various steps in this flowchart are presented and described sequentially, one of ordinary skill will appreciate that some or all of the steps may be executed in different orders and some or all of the steps may be executed in parallel. Further, in one or more embodiments of the invention, one or more of the steps described below may be omitted, repeated, and/or performed in a different order. Accordingly, the specific arrangement of steps shown in FIG. 6A should not be construed as limiting the scope of the invention.

In STEP 600, migration of a source file system residing on a source server is initiated. The migration may be initiated by a user or entity through a command prompt or other interface. In one or more embodiments of the invention, the user defines a destination server and selects a migration time (i.e., a time for performing the migration).

In STEP 602, an initial snapshot of the source file system is sent from the source server to a destination server. The initial snapshot may include data blocks, metadata, and/or protocol state data in accordance with various embodiments of the invention.

In STEP 604, a migrated file system is created in the destination server using the initial snapshot. In one or more embodiments of the invention, a confirmation of receipt is sent to the source server in response to receiving the initial snapshot. The migrated file system may be an inactive copy of the source file system.

Figure 6B:
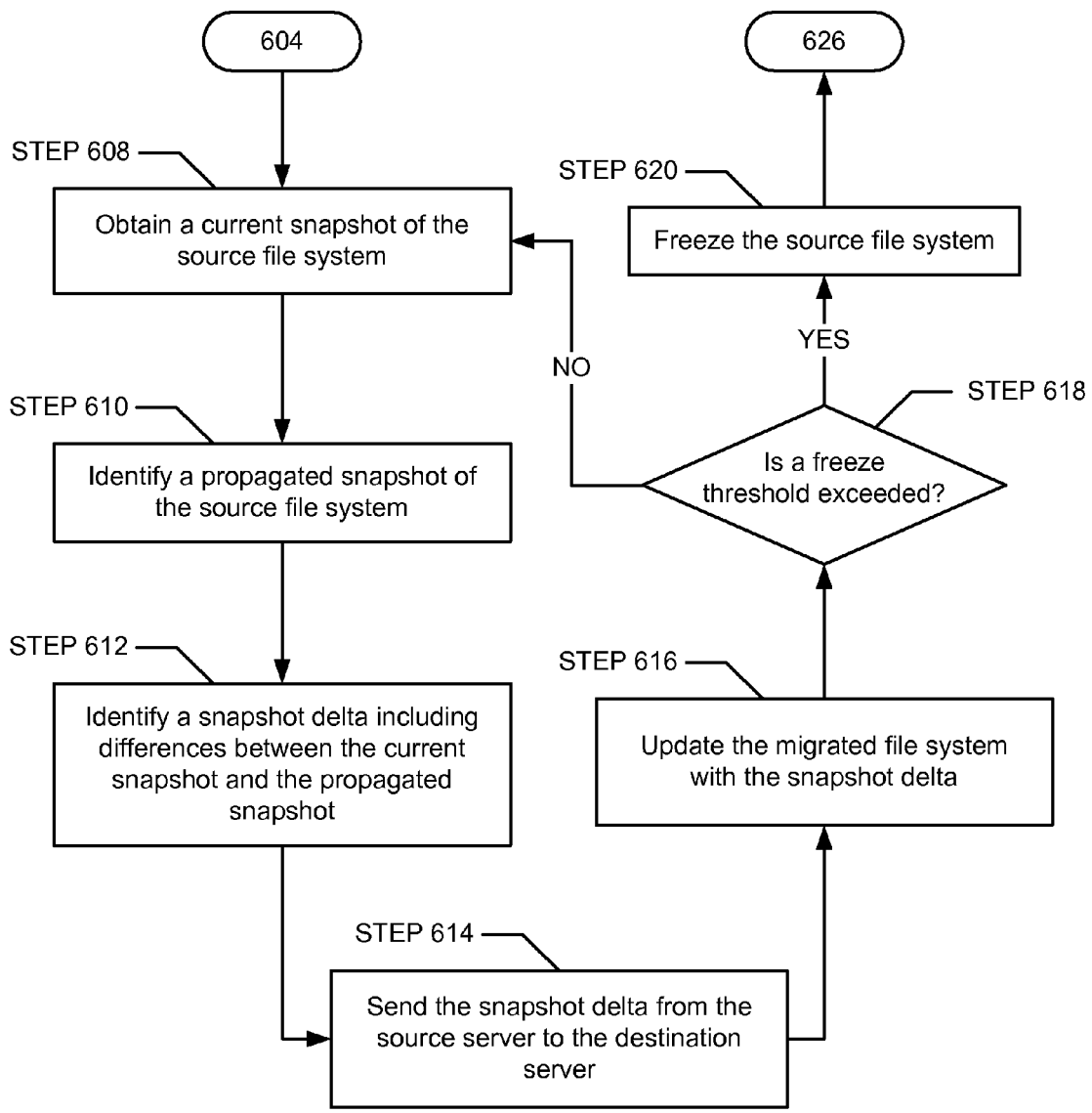
Figure 6C:
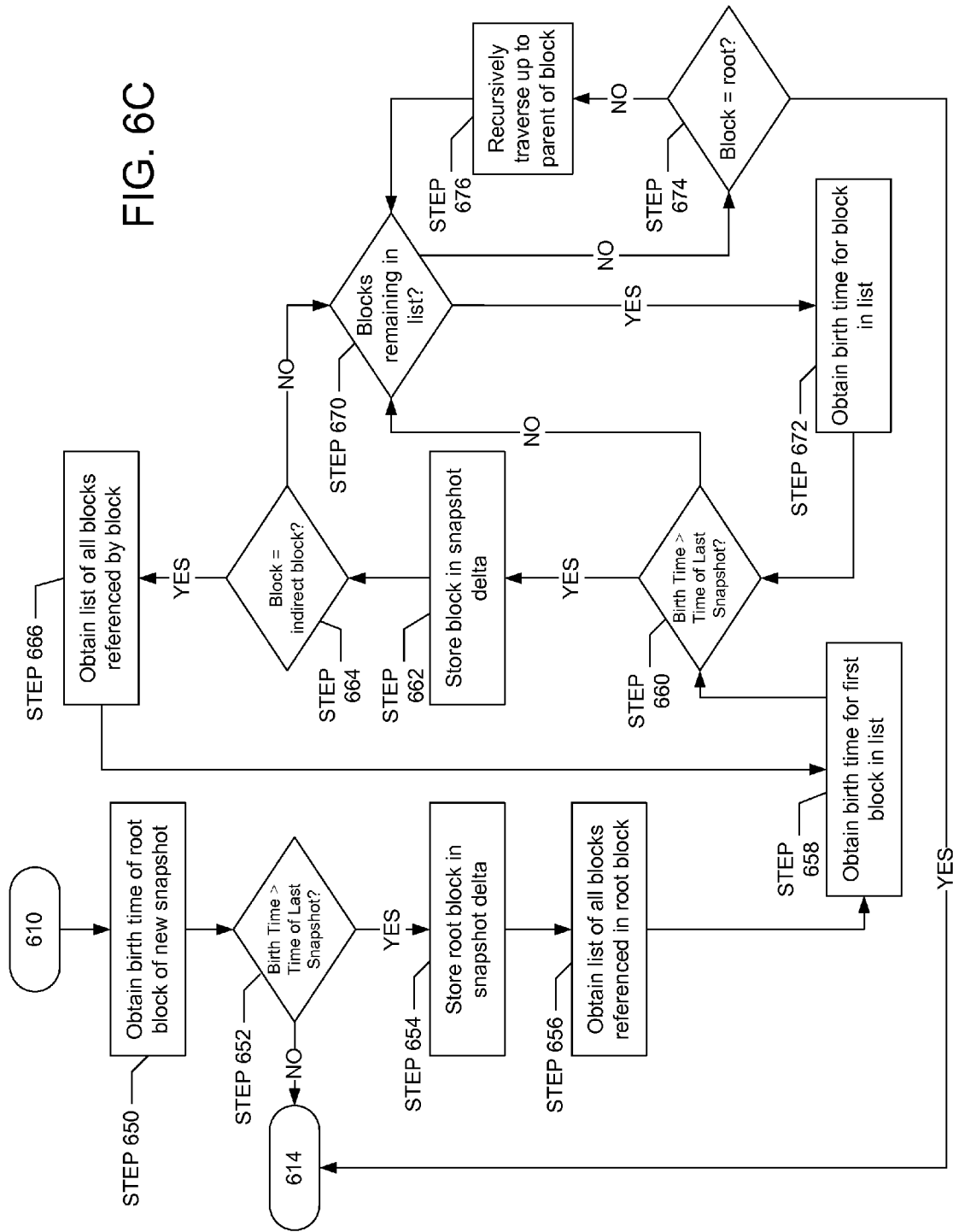

In STEP 606, a set of snapshot deltas are sequentially sent from the source server to the destination server. A snapshot delta is a collection of data describing a set of differences between two file system snapshots. Thus, the snapshot delta may describe changes which have been made to the file system between the time that a first snapshot was taken and the time that a second snapshot was subsequently taken. FIG. 6B describes a method for sending a set of snapshot deltas. After sending the initial snapshot, the source server may wait to receive a confirmation is from the destination server that the initial snapshot was received and/or imported. After receiving the confirmation, the source server may generate the first snapshot delta of the set of snapshot deltas. The source server may send the snapshot delta and wait for another confirmation (i.e., that the snapshot delta was received/imported) before generating another snapshot delta. This process may continue until a freeze threshold is exceeded or may be postponed by and administrator until a predefined future time.

In STEP 626, a final snapshot delta is sent, after freezing the source file system, from the source server to the destination server. The final snapshot delta is sent with metadata, an encoded protocol state structure, and/or any other data related to the migration, in one or more embodiments of the invention.

In STEP 628, the migrated file system is updated using the final snapshot delta. The final snapshot delta and any migration data transmitted from the source server may be imported into the migrated file system. In response to importing the data, a migration manager may begin thawing the destination server and/or send a confirmation message to the source server indicating that the import is complete.

In STEP 630, a file system husk referencing the migrated file system is created in the source file system. In STEP 630, a new, empty file system, known as a husk, may be created at the source server. In one or more embodiments of the invention, STEPS 628-630 may be performed concurrently. Thus, while sending the final snapshot delta to the destination server, the source server may create the file system husk and prepare the file system husk for activation. In one or more embodiments of the invention, upon receiving confirmation that the migrated file system is activated, the file system husk is activated.

In one or more embodiments of the invention, the file system husk has the same FSID as the source file system (prior to migration). The identical FSID may be used to find the husk in the future, as decomposing file handles into FSID and FID may be part of a server's normal mechanism for file system activation. Once the migrated file system has been activated, the file system husk may be configured to determine whether the file system has migrated. In one or more embodiments of the invention, the operating system of the source server fetches a new "moved" system attribute, which is stored on the root vnode of the husk file system. The operating system may determine, from the presence or absence of this attribute, whether the file system has been relocated. The source server may also store information about the new location of the data (e.g., a migrated file system in a destination server) as an attribute on this root vnode.

In one or more embodiments of the invention, a final conversion step is executed to change a namespace of the source server so that the new file system husk appears in place of the source file system. This change may be performed atomically such that clients see either the active source file system, the frozen source file system, or the file system husk. In this way, the server may prevent exposure of clients to any intermediate states. In one or more embodiments of the invention, the server uses an atomic remount system interface to swap the source file system with the file system husk. At the end of this operation, the file system husk may be operating in place of the source file system and the source file system, with a new FSID, may be mounted, read-only, at another location in the source server's name space. With this model, in accordance with various embodiments of the invention, a server administrator may manage this old file system, including making a backup of it or destroying it, as desired.

In STEP 632, the source file system and the migrated file system are thawed. Thawing a file system may involve enabling write access to the file system and activating the file system by enabling client/application access.

FIG. 6B shows a flowchart of a method for sending a set of snapshot deltas from a source server to a destination server. While the various steps in this flowchart are presented and described sequentially, one of ordinary skill will appreciate that some or all of the steps may be executed in different orders and some or all of the steps may be executed in parallel. Further, in one or more embodiments of the invention, one or more of the steps described below may be omitted, repeated, and/or performed in a different order. Accordingly, the specific arrangement of steps shown in FIG. 6B should not be construed as limiting the scope of the invention.

In STEP 608, a current snapshot of the source file system is obtained. This current snapshot may be generated by the source file system in response to an instruction from the migration manager. In one or more embodiments of the invention, the migration manager sends the instruction to generate the snapshot upon receiving confirmation that a snapshot or snapshot delta is propagated to the destination server.

In STEP 610, a propagated snapshot of the source file system is identified. A propagated snapshot may be any snapshot which is used to identify modifications to the source file system, where the changes have already been propagated to the destination server. Thus, the propagated snapshot may be referred to as an old snapshot. In one or more embodiments of the invention, the latest "old" snapshot may be used in order to detect incremental changes to the source file system. The propagated snapshot may (in the first iteration) be the initial snapshot (STEP 608 of FIG. 6B, discussed above) which is sent to the destination server or a subsequent snapshot taken to generate a snapshot delta.

In STEP 612, a snapshot delta is identified including differences between the current snapshot and the propagated snapshot. The snapshot delta may be generated by comparing the current snapshot with the propagated snapshot and identifying a set of differences between the two. FIG. 6C depicts an process for generating a snapshot delta, in one or more embodiments of the invention.

In STEP 614, the snapshot delta is sent from the source server to the destination server. The snapshot delta may be encrypted using any method of data encryption and may be sent according to any transmission protocol, in accordance with various embodiments of the invention.

In STEP 616, the migrated file system is updated with the snapshot delta. The snapshot delta may be imported into the migrated file system. In this way, in one or more embodiments of the invention, the data blocks of the migrated file system are modified to reflect the state of the current snapshot.

In STEP 618, it is determined whether a freeze threshold is exceeded. If it is determined that the freeze threshold is exceeded, the flowchart proceeds to STEP 620. If it is determined that the freeze threshold is not exceeded, the flowchart proceeds to STEP 608. The determination made in STEP 618 may be performed periodically during the process of sending snapshot deltas or may be performed in response to one or more events or triggers defined by the freeze threshold, in accordance with various embodiments of the invention. Thus, STEP 618 may be performed synchronously or asynchronously at any time in the process described by FIG. 6B.

In STEP 620, the source file system is frozen. The source file system may be frozen in response to a confirmation that transmission of an in-flight snapshot delta or other transmission is complete.

FIG. 6C shows a flowchart of a method for creating a snapshot delta. While the various steps in this flowchart are presented and described sequentially, one of ordinary skill will appreciate that some or all of the steps may be executed in different orders and some or all of the steps may be executed in parallel. Further, in one or more embodiments of the invention, one or more of the steps described below may be omitted, repeated, and/or performed in a different order. Accordingly, the specific arrangement of steps shown in FIG. 6C should not be construed as limiting the scope of the invention.

In STEP 650, the birth time of the root block ($R_N$) for the new snapshot is obtained. In one or more embodiments of the invention, the root block corresponds to a block that is used to initially access the file system.

In STEP 652, a determination is made about whether the birth time of $R_N$ is greater than the birth time of the root block of the last snapshot ($R_L$). In one or more embodiments of the invention, the last snapshot matches the migrated file system on the destination server (i.e., all changes to data blocks recorded in the last snapshot have been propagated). If the birth time of $R_N$ is not greater than the birth time of $R_L$, then the source file system has not changed since the last snapshot was taken (i.e., no blocks in the hierarchical block tree for that file system need to be propagated). Thus, the process ends. In one or more embodiments of the invention, in the event of an empty snapshot delta (i.e., the birth times of the file systems are equal), a freeze threshold is exceeded and the file system is frozen.

In STEP 654, when the birth time of $R_N$ is greater than the birth time of $R_L$, then the content stored in the root block is stored in a snapshot delta. In STEP 656, a list of all blocks (typically indirect blocks) referenced by $R_N$ is obtained. In STEP 658, the birth time for the first block in the list is then obtained.

In STEP 660, it is determined whether the birth time of the block is greater than the birth time of $R_L$. If the birth time of the block is not greater than the birth time of $R_L$, the process proceeds to STEP 670. Said another way, because the portion of the hierarchical block tree associated with the block does not have a birth time after the birth time of $R_L$, it does not need to be traversed. If it is determined that the birth time of the block is greater than the birth time of $R_L$, then the block (i.e., the block with the birth time obtained in Step 658) is stored in the snapshot delta (STEP 662).

In STEP 664, it is determined whether the current block (i.e., the block stored in the snapshot delta in STEP 662) is an indirect block. If it is determined that the current block is an indirect block (i.e., the block is not a data block), then the process proceeds to STEP 666. If it is determined that the current block is not an indirect block (i.e., the block is a data block), then the process proceeds to STEP 670.

In STEP 670, it is determined whether any remaining blocks exist in the list (i.e., the list of blocks obtained in STEP 656 or 666). If it is determined that there are no blocks remaining in the list, then the process proceeds to STEP 674. If it is determined that there are one or more remaining blocks in the list, then the process proceeds to STEP 672.

In STEP 674, it is determined whether the block (i.e., the block that is referencing all the blocks in the list queried in Step 670) is the root block. If it is determined that the block is the root block, then the process ends. Alternatively, if it is determined that the block is not the root block, then the process recursively traverses up the hierarchical block tree to the parent block of the block (STEP 676). The process then proceeds to STEP 670.

In STEP 666, a list of all the blocks referenced by the indirect block is obtained. Subsequently, STEPS 658-670 are repeated to perform the traversal of portions of the hierarchical block tree associated with each block referenced by the indirect block.

In STEP 672, the birth time for the next block in the list is obtained. Subsequently, STEPS 660-670 are repeated to determine whether the contents of the next block need to be backed up.

Embodiments of the present invention provide a method for finding blocks in the file system that have been modified. That is, blocks that have not been modified since the last snapshot are skipped, while only the blocks that have been modified since the last backup are stored in a snapshot delta. For example, suppose that the root block is the root of the entire file system, and each indirect block referenced by the root block is the "root" of a file. In this scenario, by examining the birth time of each of the indirect blocks referenced by the root block of the file system, the present invention is able to find only the files that have been modified since the last snapshot.

In one or more embodiments of the invention, the aforementioned process for incremental snapshots of the file system allows the process to locate modified files more efficiently because: 1) all the blocks in the file system do not need to be examined; and 2) if the file system includes one or more blocks that need to be stored in the snapshot delta, only the branches which contain those blocks are traversed. Those skilled in the art will appreciate that the process of FIG. 6C is made possible by the block-based granularity of the hierarchical tree structure that represents the file system in one or more embodiments of the invention. Additionally, in one or more embodiments of the invention, removed or added blocks are identified and added to the snapshot delta using a similar method of comparing indirect blocks in the two snapshots. Thus, removal and/or addition of blocks may be propagated as necessary using one or more snapshot deltas.

Figure 6D:
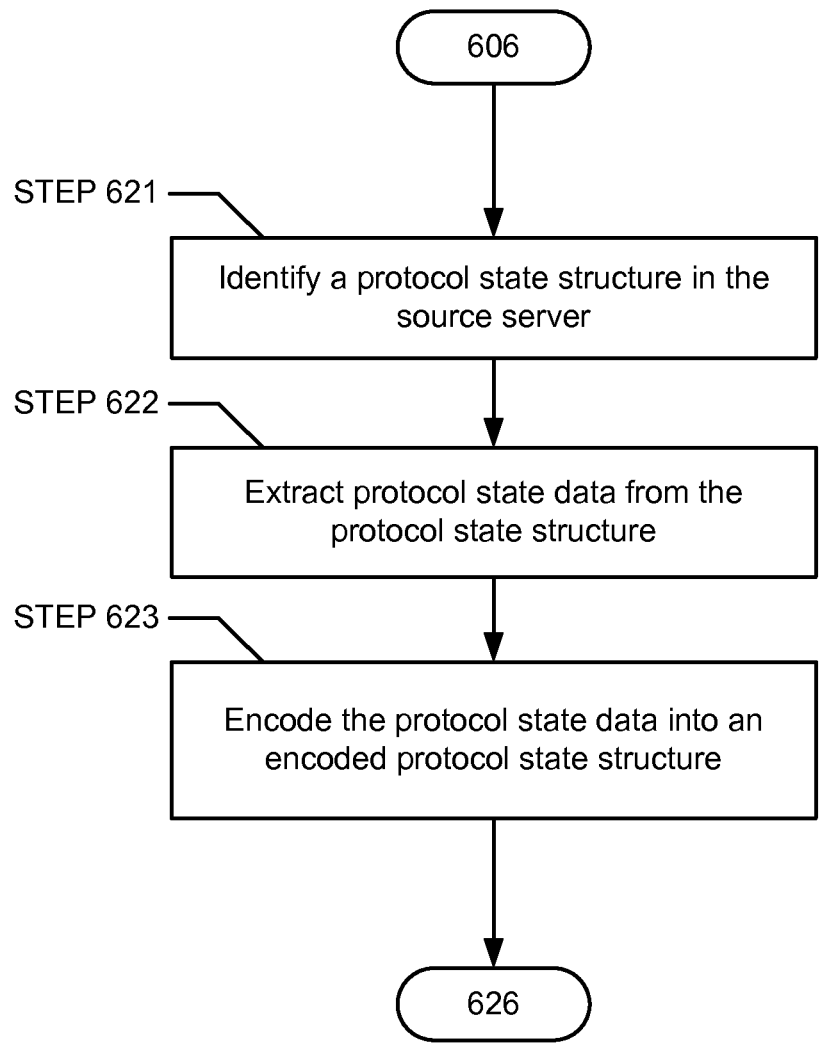

FIG. 6D shows a flowchart of a method for migrating a protocol state structure. While the various steps in this flowchart are presented and described sequentially, one of ordinary skill will appreciate that some or all of the steps may be executed in different orders and some or all of the steps may be executed in parallel. Further, in one or more embodiments of the invention, one or more of the steps described below may be omitted, repeated, and/or performed in a different order. Accordingly, the specific arrangement of steps shown in FIG. 6D should not be construed as limiting the scope of the invention.

In STEP 621, a protocol state structure is identified in the source server. The protocol state structure may be a single structure or a collection of structures corresponding to the source file system on the source server. In one or more embodiments of the invention, the protocol state structure is a set of global tables, organized in a tree fashion. The tables may include server issued protocol tokens, such as file handles, client IDs, open state IDs, lock state IDs and delegation state IDs. The tables may also include client generated protocol tokens: the long form client ID, lock owners, and open owners.

In STEP 622, a set of protocol state data is extracted from the protocol state structure. In one or more embodiments of the invention, to gather the protocol state data, a migration manager conducts a depth-first traversal of one or more state tables and gathers the relevant state tokens from each entry in each of the state tables.

In STEP 623, the set of protocol state data is encoded into an encoded protocol state structure. External Data Representation (XDR), an Internet Engineering Task Force (IETF®) standard, may be used to encode the protocol state data. In one or more embodiments of the invention, recursive methods for encoding and decoding of the protocol state data are used in conjunction with XDR.

In one or more embodiments of the invention, XDR's recursive encoding/decoding nature, fits naturally with the way NFSv4's protocol state is organized. The following pseudocode of Table 1 illustrates the recursive encoding/decoding of the protocol state tokens using XDR.

TABLE 1 pseudocode for encoding/decoding of protocol state tokens

```
xdr_encode_decode_openstate_table( )
{
    foreach (openstate) in openstate table
    {
        xdr_encode_decode_openowner( );
    }
    encode openstate entry;
}
xdr_encode_decode_openowner( )
{
    xdr_encode_decode_client( );
    encode openowner entry;
}
xdr_encode_decode_client( )
{
    encode client entry;
}
```

The embodiment depicted in Table 1 may accomplish any one of several aspects of state migration: (a) encoding and decoding of the protocol state tokens; and (b) gathering and re-establishing of the protocol state on the source as well as the destination server. As the pseudo code depicted in Table 1 executes, the first element to be encoded may be the client entry from the client table, followed by the openowner entry, and then the openstate entry. Hence, during decoding, the client will be decoded first, followed by openowner, and then finally the openstate. This is identical to how the protocol creates state at the server, allowing us to re-establish state at the destination server in a natural order.

In one or more embodiments of the invention, the encoded state tokens are written out to one or more files after being encoded in a machine-independent format. One simple approach, in one or more embodiments of the invention, is to create a very large XDR buffer that can hold the entire encoded byte stream for NFSv4 state and then write that buffer out to file. This may be more efficient in applications where the state size is bounded and small. In one or more embodiments of the invention, (e.g., for a larger state size), during the state gathering phase, the migration manager may write the state tokens out after XDR encoding them in a certain block size. In one or more embodiments of the invention, the migration manager includes functionality to gather information about the mainline state (e.g., state harvester). The harvester may allocate an XDR stream buffer and keep track of the current size of the buffer. Also, the harvester may detect if the buffer is full, write it out to a file, and reinitialize the buffer. It is easy to see that in one or more embodiments of the invention, the harvester may be aware of all the details related to buffer management and writing to a file.

In one or more embodiments of the invention, the migration manager decouples the state gathering from buffer and file management using a new implementation of the XDR interface, called xdrvnode. xdrvnode may be responsible for allocating the buffer(s), writing it out to the file as the buffer(s) fill up, and re-initializing the XDR stream to reuse the buffers already written out to the file. In one or more embodiments of the invention, the consumer of xdrvnode is only responsible for providing a pointer to the XDR stream, the data to be encoded/decoded, and/or a pointer to the vnode of the file to which the data must be written out. This may allow the XDR encoding and decoding process to be completely oblivious of how the encoded data is written or read from the files into the kernel memory.

In one or more embodiments of the invention, the encoded protocol data structure is stored at the root of the file system being migrated, and is migrated along with the final snapshot delta. During state import, the destination server may re-establish state with the migrated file system (e.g., file locks and share locks). In one example, for each migrated file, the server reactivates the vnode in the migrated file system on the destination (via VFS_VGET), then VOP_OPENs each file and VOP_FRLOCKs for each file lock being migrated.

The following section describes various examples of the invention. The examples are included to aid in the understanding of the invention but are not intended to limit the scope of the invention.

Figure 7A:
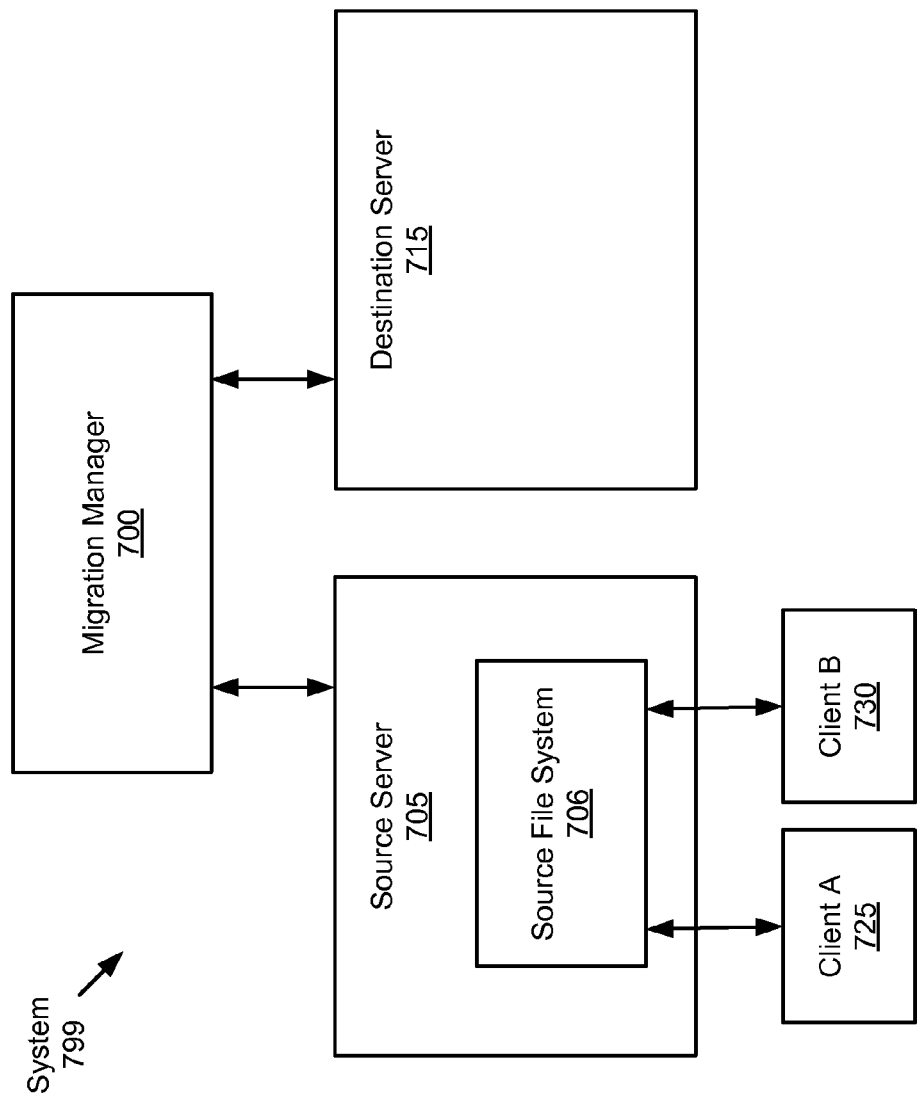
FIGS. 7A and 7F show an example system in accordance with one embodiment of the invention.

FIG. 7A shows an example system (799) in accordance with one embodiment of the invention. FIG. 7A depicts the system (799) prior to performing migration of the source file system (706). In this example, a source file system (706) residing on a source server (705) is migrated to a destination server (715). First, an administrator of the servers initiates the migration through a user interface of the migration manager (700) by selecting the source server (705), the source file system (706), and the destination server (715). Those skilled in the art will appreciate that the process may be initiated by a process executing on a server without departing from the invention.

Figure 7B:
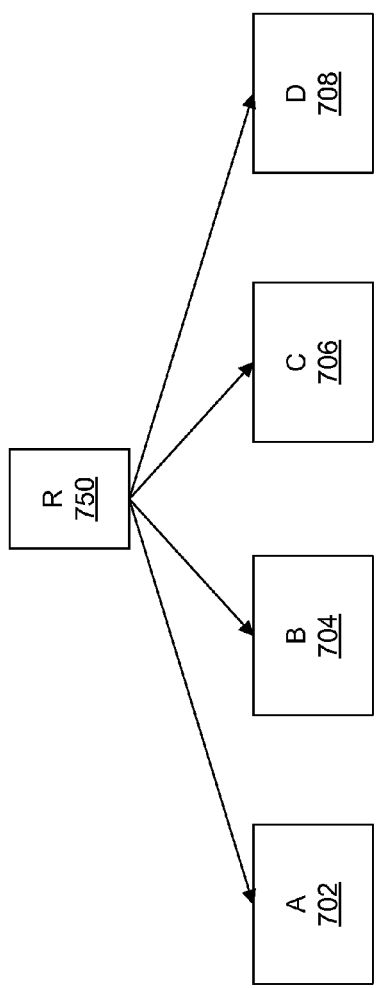
FIGS. 7B-7E show an example hierarchical block tree in accordance with one embodiment of the invention.
Figure 7C:
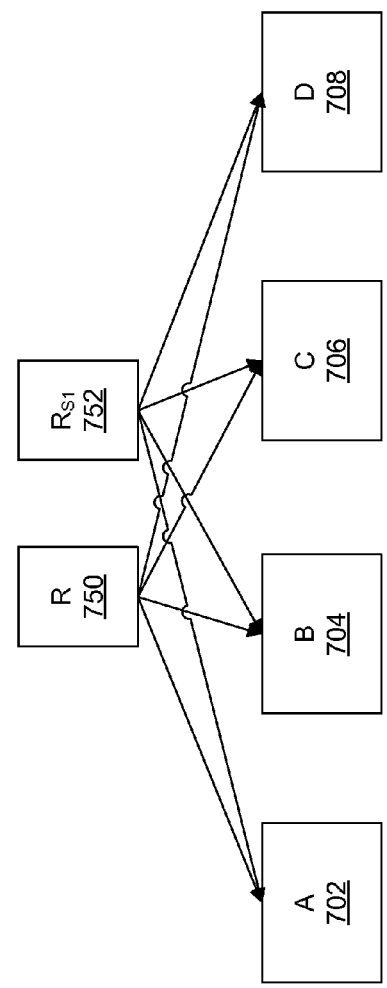

Continuing the example, FIGS. 7B-7E show an example hierarchical block tree (HBT) in accordance with one embodiment of the invention. While, the HBT shown in FIGS. 7B-7E only include root blocks and data blocks, the invention applies to HBTs that include root blocks, indirect blocks, and data blocks. Turing to FIG. 7B, FIG. 7B depicts the HBT of the source file system (706, FIG. 7A) after initiating the migration, but prior to taking a first snapshot of the source file system (706). At this time, the migration manager (700, FIG. 7A) takes the first snapshot of the HBT. This first snapshot is depicted as $R_{S1}$ (752) in FIG. 7C. In this example, the copy-on-write functionality of the source file system (706, FIG. 7A) requires that references be maintained to each data block under the root node R (750).

Figure 7D:
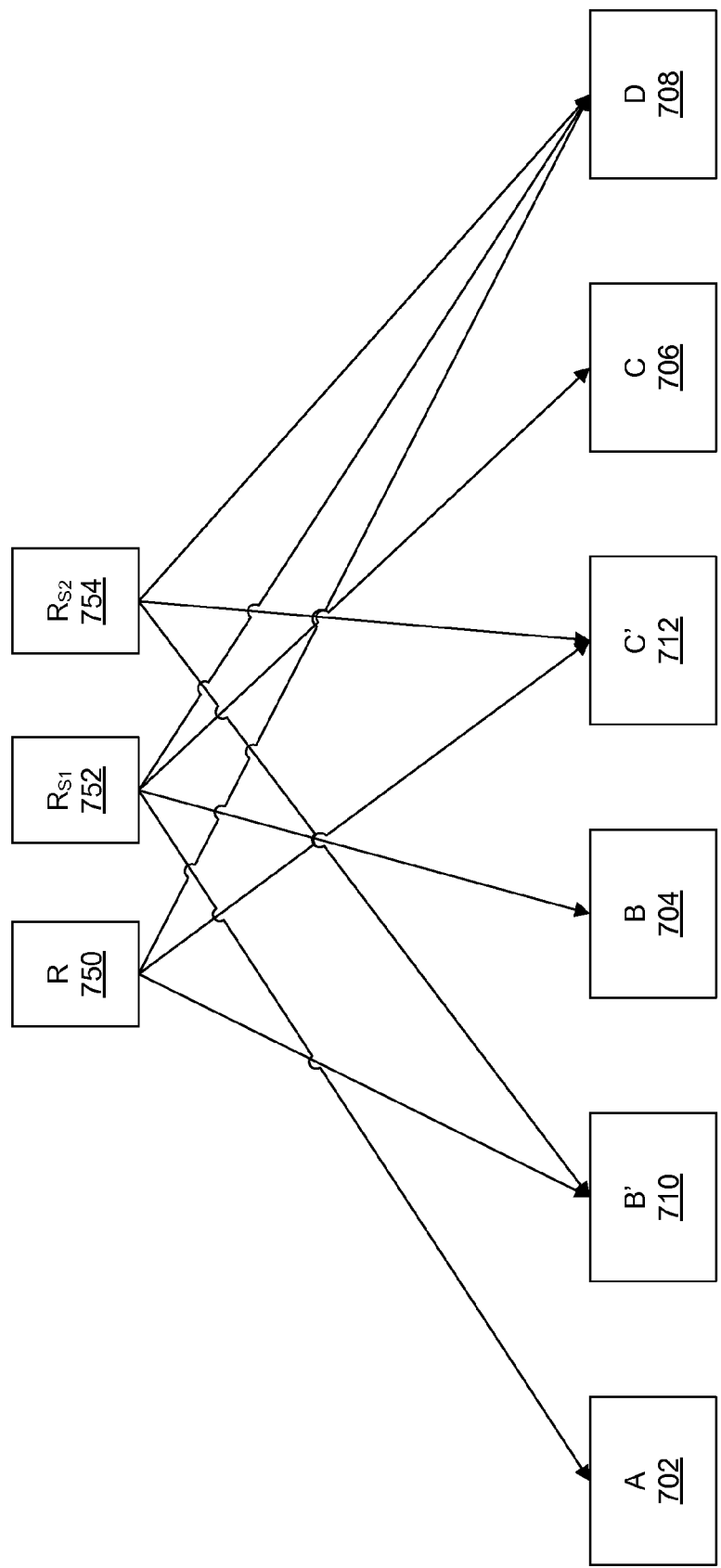

Continuing the example, the migration manager (700, FIG. 7A) sends the first snapshot from the source server (705, FIG. 7A) to the destination server (715, FIG. 7A). The migration manager (700, FIG. 7A) then creates a migrated file system (not shown) in the destination server (715, FIG. 7A) and imports the first snapshot into the destination server (715, FIG. 7A). After taking the first snapshot, the source file system (706, FIG. 7A) is modified by a set of remote and local client applications. As depicted in FIG. 7D, the root node R (750) no longer references data blocks A (702), B (704), or C (706). In fact, what has happened is that the contents of data blocks B (704) and C (706) have been modified. As a result, the source file system (706, FIG. 7A) includes modified version of original data blocks B and C, which are denoted as data blocks B' (710) and C' (712). As the data block A (702) was deleted from the source file system (706, FIG. 7A), it is no longer referenced by the root node R (750), though it remains referenced by the root block of the first snapshot ($R_{S1}$ (752)).

Continuing the example, after receiving confirmation that the first snapshot was received by the destination server (715, FIG. 7A), the migration manager (700, FIG. 7A) instructs the source file system (706, FIG. 7A) to take a second snapshot. FIG. 7D depicts a state of the HBT, the first snapshot $R_{S1}$ (752), and the second snapshot $R_{S2}$ (754) at this point of the example. The migration manager (700, FIG. 7A) then initiates a comparison of the first snapshot with the second snapshot. The comparison does not require a full traversal of either tree in order to identify differences. Due to the structure of each snapshot and the recording of birth times for each block within each snapshot tree, it is possible to identify the differences between the trees without exhaustive search (as described, for example, in FIG. 6C).

Continuing the example, a first snapshot delta is generated based on the comparison. At this point, the first snapshot delta is sent, by the migration manager (700, FIG. 7A) to the destination server (715, FIG. 7A). After sending each snapshot delta, the migration manager (700, FIG. 7A) performs an evaluation of a set of freeze thresholds defined for the migration. In this example, assume that one of the aforementioned freeze thresholds is deemed to be exceeded if a transmission and propagation of any snapshot delta falls below a time period of 1 second. The first delta snapshot is transmitted and propagated in 3 seconds and, therefore, the freeze threshold is not exceeded.

Figure 7E:
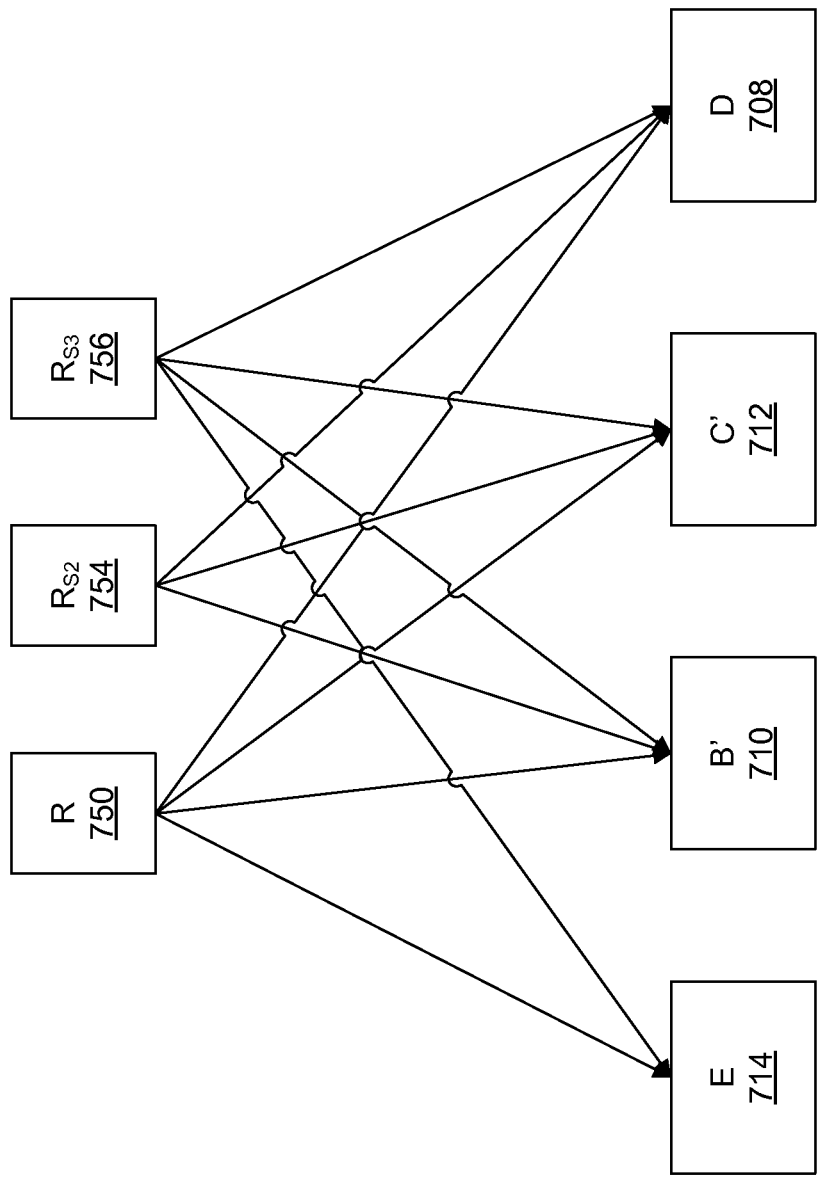

Continuing the example, while the first snapshot delta is in the process of being transmitted, the source file system is again modified by client applications. As shown in the example of FIG. 7E, the root node R (750) has been modified only slightly to include a reference to a new data block E (714). For clarity, the data blocks associated with the first snapshot $R_{S1}$ (752) are not shown in FIG. 7E. Upon receiving confirmation that the first snapshot delta is propagated to the destination server (715, FIG. 7A), the migration manager (700, FIG. 7A) instructs the source file system (706, FIG. 7A) to take a third snapshot. In FIG. 7E, the third snapshot is depicted as $R_{S3}$ (756). The migration manager (700, FIG. 7A) then performs a comparison of the last snapshot $R_{S2}$ (754) with the current snapshot $R_{S3}$ (756) in order to generate a second snapshot delta (not shown). The only identified difference between the two snapshots is the addition of new data block E (714). Thus, the second snapshot delta is notably smaller than the first snapshot delta. This is due to the fact that transmission and propagation of the first snapshot completed in a time period of about 30 seconds, during which the source file system (706, FIG. 7A) was open to modification. These modifications are captured in the first snapshot delta which is notably larger. On the other hand, the second snapshot delta includes only changes which were made to the source file system (706, FIG. 7A) during transmission of the first snapshot delta, which required only 3 seconds to complete.

Continuing the example, the second snapshot delta is transmitted to the destination server (715, FIG. 7A). The transmission and propagation of the second snapshot delta is completed in 900 milliseconds. After performing the propagation, the migration manager (700, FIG. 7A) evaluates the freeze thresholds and determines that, because the second snapshot delta was transmitted and propagated in less than one second, a freeze threshold is exceeded. The migration manager (700, FIG. 7A) then freezes the source file system (706, FIG. 7A) and takes a final snapshot (not shown). This final snapshot is compared against $R_{S3}$ (756) and a final snapshot delta is generated and sent to the destination server (715, FIG. 7A).

Figure 7F:
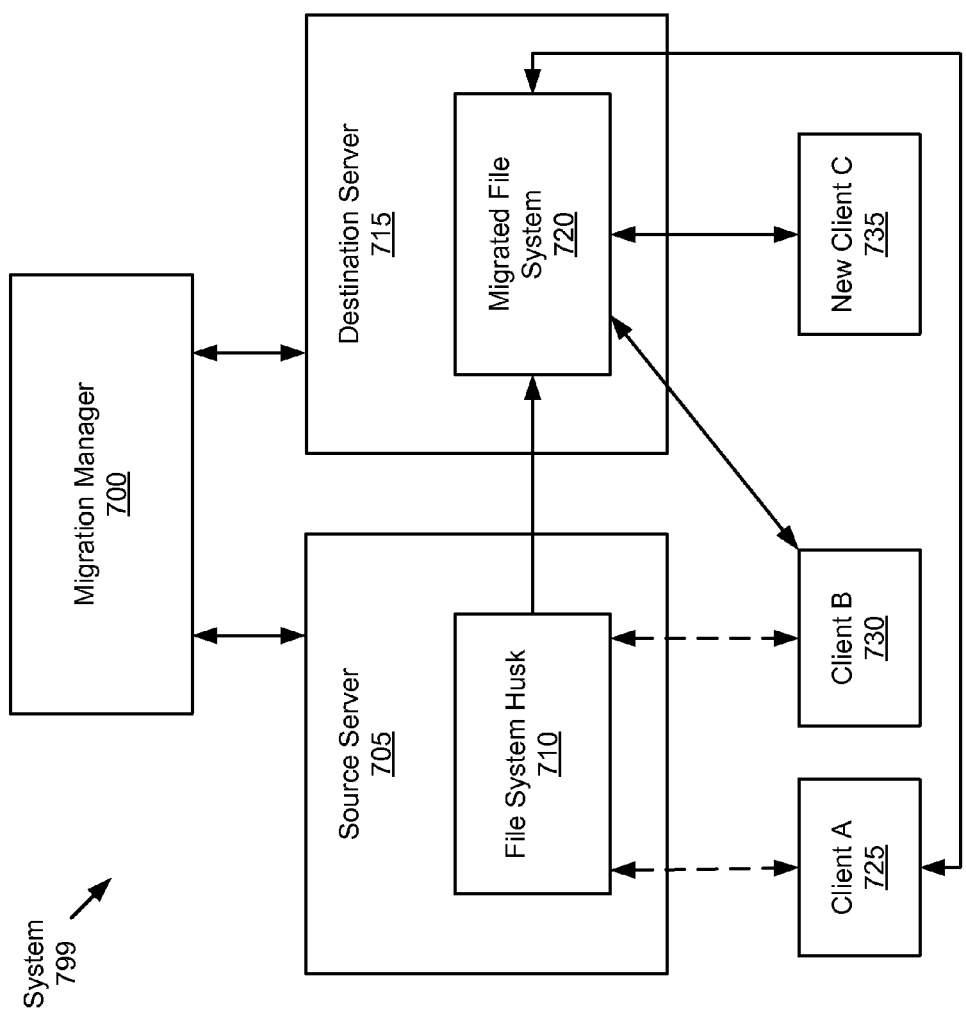

Continuing the example, FIG. 7F shows the example system (799) in accordance with one embodiment of the invention. FIG. 7F depicts the system (799) after performing migration of the source file system (706) to the destination server (715). After freezing the source file system, the migration manager (700) creates a file system husk (710) on the source server (705). This file system husk (710) includes an empty file system referencing the migrated file system (720).

Continuing the example, after updating the migrated file system (720) with the final snapshot delta, the migration manager (700) thaws the migrated file system (720). After confirming that the migrated file system (720) is activated, the migration manager (700) thaws the file system husk (710). At this time, new client C (735) begins accessing the migrated file system, while old clients A (725) and B (730) access the file system husk (710) based on old protocol state data referencing the source server (705). The file system husk (710) redirects the clients A (725) and B (730) to the migrated file system (720) and all future requests are handled by the migrated file system (720) accordingly.

In one or more embodiments of the invention, by migrating file system data incrementally, through a sequence of snapshot deltas, it may be possible to reduce the amount of delay experienced by one or more clients due to a frozen file system. Further, in one or more embodiments of the invention, by migrating protocol state data during a file system migration, it may be possible to perform the migration transparently to one or more applications running on a client device. Furthermore, migrating file handles and maintaining the consistency of old file handles with new file handles in a file system migration may further reduce the possibility of data loss and/or loss of client state information.

Figure 8:
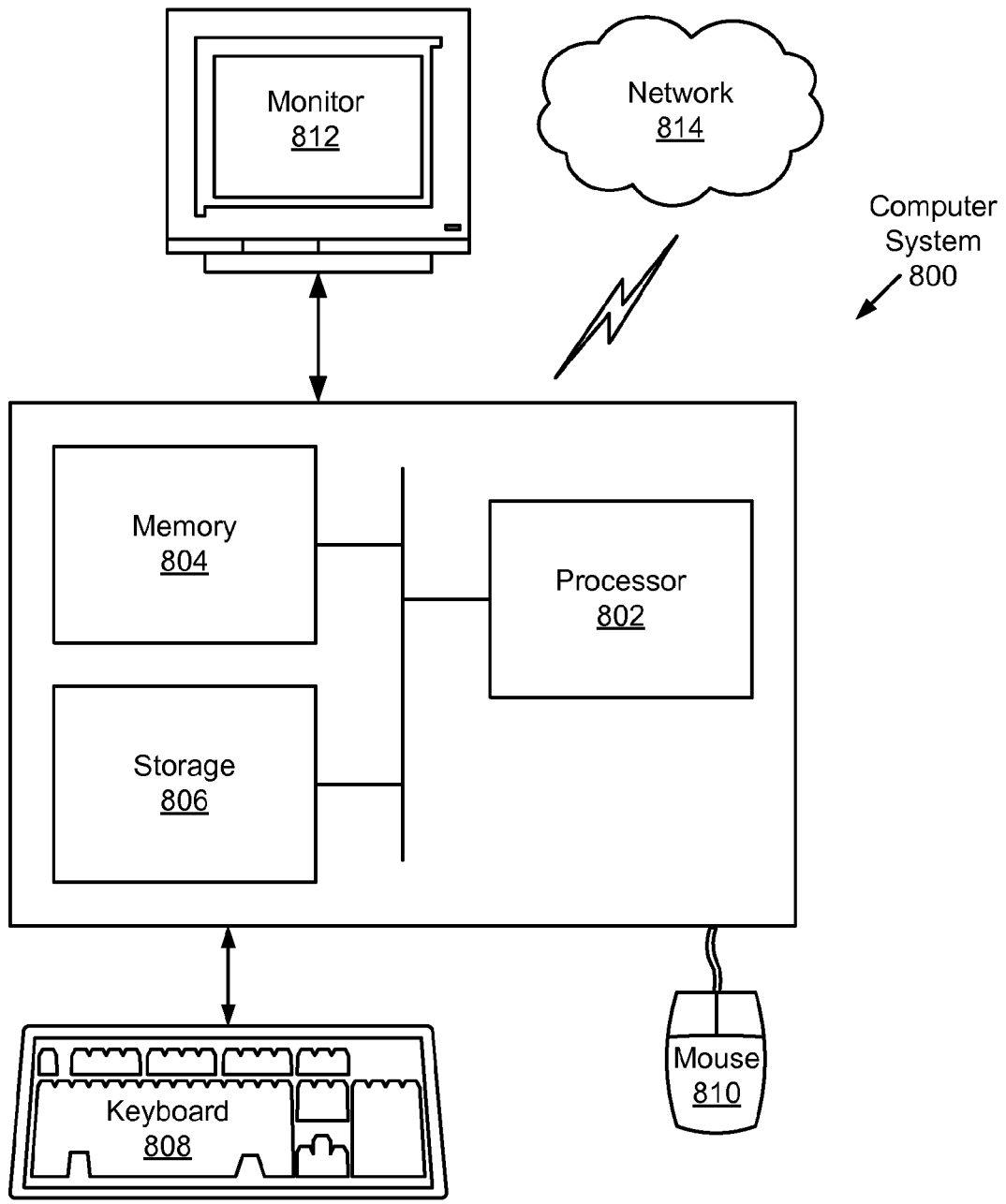
FIG. 8 shows a computer system in accordance with one or more embodiments of the invention.

Embodiments of the invention may be implemented on virtually any type of computer regardless of the platform being used. For example, as shown in FIG. 8, a computer system (800) includes one or more processor(s) (802) (such as a central processing unit (CPU), integrated circuit, hardware processor, etc.), associated memory (804) (e.g., RAM, cache memory, flash memory, etc.), a storage device (806) (e.g., a hard disk, an optical drive such as a compact disk drive or digital video disk (DVD) drive, a flash memory stick, etc.), and numerous other elements and functionalities typical of today's computers (not shown). The computer system (800) may also include input means, such as a keyboard (808), a mouse (810), or a microphone (not shown). Further, the computer system (800) may include output means, such as a monitor (812) (e.g., a liquid crystal display (LCD), a plasma display, or cathode ray tube (CRT) monitor). The computer system (800) may be connected to a network (814) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the computer system (800) includes at least the minimal processing, input, and/or output means necessary to practice embodiments of the invention.

Further, in one or more embodiments of the invention, one or more elements of the aforementioned computer system (800) may be located at a remote location and connected to the other elements over a network. Further, embodiments of the invention may be implemented on a distributed system having a plurality of nodes, where each portion of the invention (e.g., migration manager (100), source file system (110), and destination server (115) of FIG. 1, discussed above) may be located on a different node within the distributed system. In one or more embodiments of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a non-transitory computer readable storage medium, such as a compact disc (CD), a diskette, a tape, memory, or any other tangible computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for migrating a source file system residing on a source server to a destination server, comprising:
   sending a first snapshot of the source file system from the source server to the destination server;
   creating, using the first snapshot, a migrated file system on the destination server;
   sequentially sending, from the source server to the destination server, a plurality of snapshot deltas comprising modifications to the source file system;
   updating the migrated file system using the plurality of snapshot deltas;
   determining that a freeze threshold is exceeded based on a snapshot delta of the plurality of snapshot deltas;
   in response to determining that the freeze threshold is exceeded:
   freezing the source file system, wherein the source file system is active prior to freezing;
   wherein freezing the source file system comprises allowing a plurality of in-flight operations to complete and deleting a plurality of new operations;
   sending, after freezing the source file system, a final snapshot delta from the source server to the destination server;
   updating the migrated file system using the final snapshot delta;
   creating, in the source file system, a file system husk referencing the migrated file system; and
   thawing the source file system and the migrated file system after updating the migrated file system.

2. The method of claim 1, wherein sequentially sending the plurality of snapshot deltas comprises:
   identifying, after sending the first snapshot, a second snapshot of the source file system;
   performing a comparison of the first snapshot with the second snapshot;
   identifying, based on the comparison, a first snapshot delta of the plurality of snapshot deltas comprising a first plurality of differences between the first snapshot and the second snapshot; and
   sending the first snapshot delta from the source server to the destination server, wherein updating the migrated file system using the plurality of snapshot deltas comprises updating, after sending the first snapshot delta, the migrated file system with the first snapshot delta.

3. The method of claim 1, wherein determining that the freeze threshold is exceeded comprises:

determining a transmission time period for sending the snapshot delta to the destination server; and determining that a freeze threshold duration exceeds the transmission time period.

4. The method of claim 1, wherein determining that the freeze threshold is exceeded comprises:

identifying a size of the snapshot delta; and determining that a freeze size threshold exceeds the size.

5. The method of claim 1, further comprising:

identifying a protocol state structure on the source server;

extracting a plurality of protocol state data from the protocol state structure;

encoding the plurality of protocol state data into an encoded protocol state structure;

sending the encoded protocol state structure to the destination server with the final snapshot delta;

extracting, by the destination server, the plurality of protocol state data by decoding the encoded protocol state structure; and importing the plurality of protocol state data into a migrated protocol state structure on the destination server.

6. The method of claim 5, wherein the plurality of protocol state data comprises a plurality of client protocol data mapping a plurality of client computing devices to a plurality of files in the source file system, and wherein the plurality of client protocol data is obtained using an over-the-wire protocol.

7. The method of claim 1, further comprising:

receiving, from a client application, a first request to modify the source file system, wherein the source file system is active while receiving the first request;

modifying the source file system in response to the first request;

receiving, after freezing the source file system and before thawing the source file system, a second request from the client application to modify the source file system; and denying the second request.

8. The method of claim 1, further comprising:

receiving, by the file system husk, a request for data from a client computing device; and sending a reference to the migrated file system to the client computing device, wherein the client computing device directs a plurality of future requests to the migrated file system in response to receiving the reference.

9. The method of claim 1, further comprising:

receiving, prior to sending the first snapshot, an instruction to migrate the source file system from the source server to the destination server.

10. The method of claim 1, further comprising:

identifying a plurality of file handles corresponding to files in the source file system; and reconstructing the plurality of file handles in the migrated file system.

11. The method of claim 1, wherein thawing the migrated file system comprises activating the migrated file system.

12. A non-transitory computer-readable medium storing a plurality of instructions for migrating a source file system residing on a source server to a destination server, the plurality of instructions comprising functionality to:

send a first snapshot of the source file system from the source server to the destination server;

create, using the first snapshot, a migrated file system on the destination server;

sequentially send, from the source server to the destination server, a plurality of snapshot deltas comprising modifications to the source file system;

update the migrated file system using the plurality of snapshot deltas;

determine that a freeze threshold is exceeded based on a snapshot delta of the plurality of snapshot deltas;

in response to determining that the freeze threshold is exceeded:

freeze the source file system, wherein the source file system is active prior to freezing;

wherein freezing the source file system comprises allowing a plurality of in-flight operations to complete and deleting a plurality of new operations;

send, after freezing the source file system, a final snapshot delta from the source server to the destination server;

update the migrated file system using the final snapshot delta;

create, in the source file system, a file system husk referencing the migrated file system; and thaw the source file system and the migrated file system after updating the migrated file system.

13. The non-transitory computer-readable medium of claim 12, wherein sequentially sending the plurality of snapshot deltas comprises:

identifying, after sending the first snapshot, a second snapshot of the source file system;

performing a comparison of the first snapshot with the second snapshot;

identifying, based on the comparison, a first snapshot delta of the plurality of snapshot deltas comprising a first plurality of differences between the first snapshot and the second snapshot; and sending the first snapshot delta from the source server to the destination server, wherein updating the migrated file system using the plurality of snapshot deltas comprises updating, after sending the first snapshot delta, the migrated file system with the first snapshot delta.

14. The non-transitory computer-readable medium of claim 12, wherein the plurality of instructions further comprise functionality to:

identify a plurality of file handles corresponding to files in the source file system; and reconstruct the plurality of file handles in the migrated file system.

15. A system for migrating file systems, comprising:

a source server comprising a memory and a source file system;

a destination server; and a migration manager configured to:

send a first snapshot of the source file system from the source server to the destination server;

create, using the first snapshot, a migrated file system on the destination server;

sequentially send, from the source server to the destination server, a plurality of snapshot deltas comprising modifications to the source file system;

update the migrated file system using the plurality of snapshot deltas;

determine that a freeze threshold is exceeded based on a snapshot delta of the plurality of snapshot deltas;

in response to determining that the freeze threshold is exceeded:

freeze the source file system, wherein the source file system is active prior to freezing;

wherein freezing the source file system comprises allowing a plurality of in-flight operations to complete and deleting a plurality of new operations;

send, after freezing the source file system, a final snapshot delta from the source server to the destination server;

update the migrated file system using the final snapshot delta;

create, in the source file system, a file system husk referencing the migrated file system; and thaw the source file system and the migrated file system after updating the migrated file system.

16. The system of claim 15, further comprising:

a common service communicatively connected to the source server and the destination server and configured to:

assign, prior to creating the migrated file system, a unique file system identifier (FSID) to the source file system, wherein the unique FSID is stored as a persistent attribute within the source file system, and wherein a plurality of file handles from the source file system are maintained in the migrated file system.

17. The system of claim 15, wherein sequentially sending the plurality of snapshot deltas comprises:

identifying, after sending the first snapshot, a second snapshot of the source file system;

performing a comparison of the first snapshot with the second snapshot;

identifying, based on the comparison, a first snapshot delta of the plurality of snapshot deltas comprising a first plurality of differences between the first snapshot and the second snapshot; and sending the first snapshot delta from the source server to the destination server, wherein updating the migrated file system using the plurality of snapshot deltas comprises updating, after sending the first snapshot delta, the migrated file system with the first snapshot delta.

18. The system of claim 15, wherein the migration manager is further configured to:

identify a plurality of file handles corresponding to files in the source file system; and reconstruct the plurality of file handles in the migrated file system.

19. The system of claim 15, wherein the migration manager is further configured to:

identify a protocol state structure on the source server;

extract a plurality of protocol state data from the protocol state structure;

encode the plurality of protocol state data into an encoded protocol state structure;

send the encoded protocol state structure to the destination server with the final snapshot delta;

extract, by the destination server, the plurality of protocol state data by decoding the encoded protocol state structure; and import the plurality of protocol state data into a migrated protocol state structure on the destination server.

\* \* \* \* \*